(12) United States Patent
Hawkins

(10) Patent No.: US 7,184,046 B1
(45) Date of Patent: Feb. 27, 2007

(54) METHOD AND APPARATUS FOR FONT STORAGE REDUCTION

(75) Inventor: Thomas B. Hawkins, Temple, NH (US)

(73) Assignee: Monotype Imaging Inc., Woburn, MA (US)

( * ) Notice: Subject to any disclaimer, the term of this patent is extended or adjusted under 35 U.S.C. 154(b) by 526 days.

(21) Appl. No.: 09/407,381

(22) Filed: Sep. 28, 1999

(51) Int. Cl.
*G06T 11/20* (2006.01)

(52) U.S. Cl. .................. 345/468; 345/467; 345/469

(58) Field of Classification Search ............. 345/467, 345/468, 469
See application file for complete search history.

(56) References Cited

U.S. PATENT DOCUMENTS

| | | | | |
|---|---|---|---|---|
| 4,675,830 A | * | 6/1987 | Hawkins ..................... | 345/666 |
| 5,301,267 A | * | 4/1994 | Hassett et al. .............. | 345/469 |
| 5,305,433 A | * | 4/1994 | Ohno ......................... | 345/469 |
| 5,468,077 A | * | 11/1995 | Motokado et al. .......... | 400/76 |
| 5,754,187 A | * | 5/1998 | Ristow et al. .............. | 345/469 |
| 5,940,084 A | * | 8/1999 | Motokado et al. .......... | 345/468 |
| 5,959,635 A | * | 9/1999 | Watanabe et al. ........... | 345/469 |
| 6,016,155 A | * | 1/2000 | Hiraike ...................... | 345/468 |
| 6,157,750 A | * | 12/2000 | Choi et al. ................... | 382/301 |
| 6,249,908 B1 | * | 6/2001 | Stamm ........................ | 717/113 |
| 6,504,545 B1 | * | 1/2003 | Browne et al. ............. | 345/473 |
| 6,538,756 B1 | * | 3/2003 | Hasegawa et al. ......... | 358/1.11 |
| 2002/0070938 A1 | * | 6/2002 | Asai et al. .................. | 345/469 |

* cited by examiner

*Primary Examiner*—Kee M. Tung
*Assistant Examiner*—J. Amini
(74) *Attorney, Agent, or Firm*—Breiner & Breiner, LLC

(57) ABSTRACT

The present invention is aimed at three specific data areas of font compression, each of whose size has become significant as other data areas have been compressed. The three data areas include model factoring, character level feature measurement (local dimensions) factoring, and typeface level feature measurement (global dimensions) factoring. In general, the invention in each area is an apparatus and method used in font compression to reduce redundant information, thereby allowing a reduction in data format (e.g., words to bytes and bytes to bits) resulting in an overall reduction in storage area for a given font collection.

40 Claims, 12 Drawing Sheets

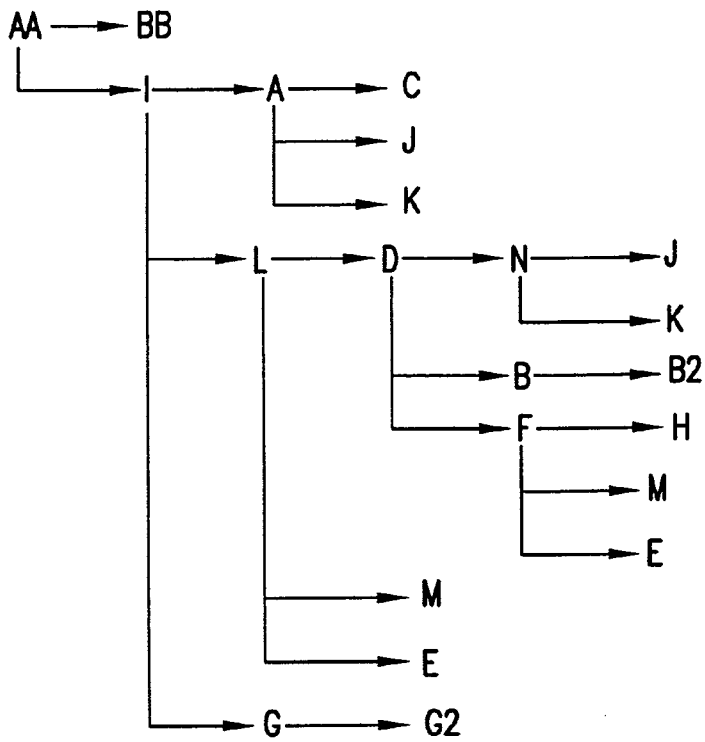
FIG.5
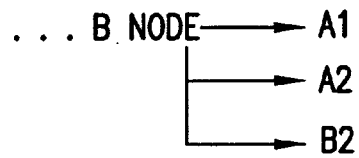
FIG.6A
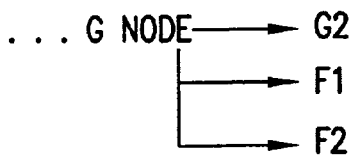
FIG.6B
... B NODE ──→ B2 ──→ B3
... G NODE ──→ G2 ──→ G3
FIG.6C

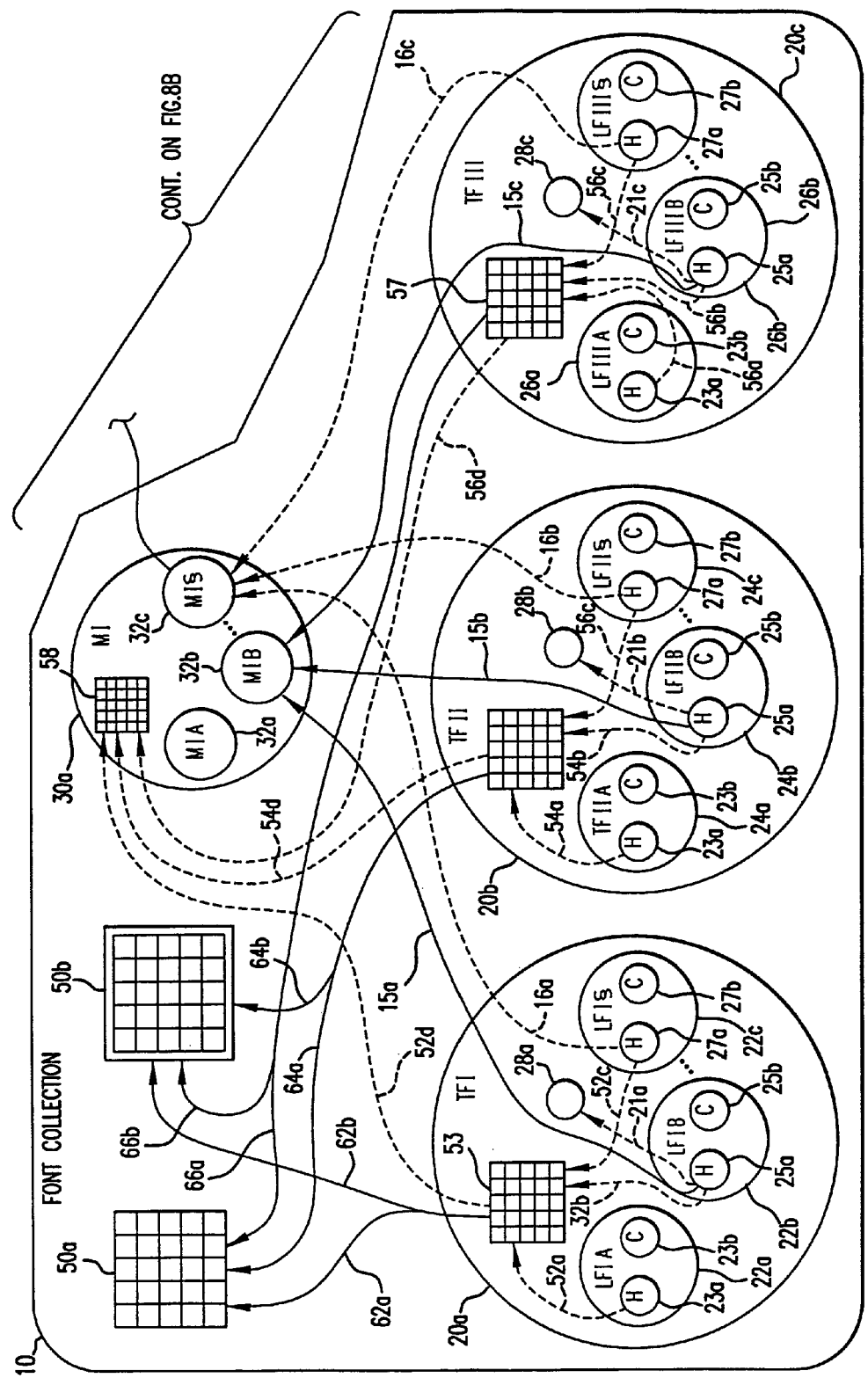
FIG.8A (MODEL FACTORING PROCESS)

CONT. FROM FIG.8A

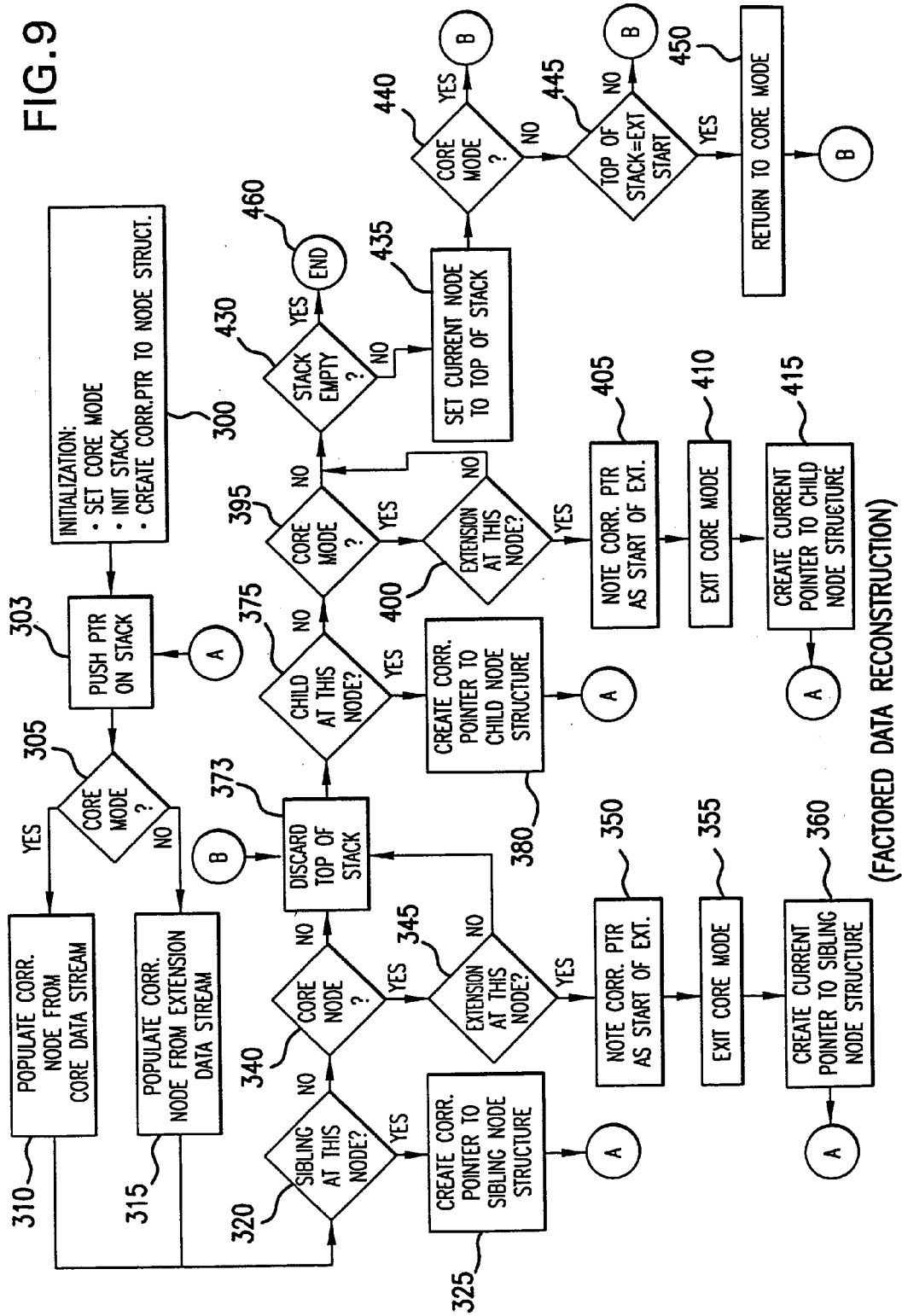
FIG. 9 (FACTORED DATA RECONSTRUCTION)

| TYPEFACE | TF0 | TF1 | TF2 | TF3 | TF4 | TF5 | TF6 | TF7 | TF8 | RANGE | BITS |
|---|---|---|---|---|---|---|---|---|---|---|---|
| DIMENSION 0 | 148 | 135 | 154 | 161 | 151 | 138 | 141 | 147 | 142 | 135–161 | 8 |
| BASE=135 | 135+13 | 135+0 | 135+19 | 135+26 | 135+16 | 135+3 | 135+6 | 135+12 | 135+7 | 0–26 | 5 |
| DIMENSION 1 | 148 | 135 | 154 | 159 | 155 | 138 | 141 | 147 | 142 | 24 | 5 |
| PARENT=dim0 | 148+0 | 135+0 | 154+0 | 161−2 | 151+4 | 138+0 | 141+0 | 147+0 | 142+0 | −2–4 | 4 |

FIG.12

METHOD AND APPARATUS FOR FONT STORAGE REDUCTION

BACKGROUND OF THE INVENTION

Computer users expect low latency, high-quality monitor display and printer output, particularly in the area of text fonts. Since the advent of desktop publishing applications operating on personal computers, individuals have been publishing documents having a wide range of fonts. Storing fonts in computers and laser printers consumes a lot of digital memory, which results in trading off computer memory cost with the number of fonts being provided for the user. For this reason, there have been developments in reducing the storage size of text fonts while maintaining the high-quality output computer users have come to expect.

When an analog version of a letterform is converted to digital form for output on a raster device, there can be a significant loss of important detail due to quantization. Additionally, storing the digital version in its raster form for direct output on a raster device restricts output sizes unless many raster resolutions are made available, thereby increasing digital data storage requirements.

Several systems (AGFA® Intellifont®, Adobe® Type1™, Apple®/Microsoft® TrueType®) have been developed to deal with this problem by capturing digital letterforms as "scalable outlines" to promote size and resolution independence and by providing "scaling hints" to reduce the negative effects of low resolution rasterization.

The capability of these systems to deliver quality output has led to increased demand by computer/software users for a wider range of typeface designs. As more typefaces have become available, there has been increased interest in methods of font data compression. Systems developed to address this problem fall into two basic categories: font compression by synthesis and font compression by factoring.

Compression by Font Synthesis:

The FontChameleon® font compression technique incorporates one or more "master fonts" and more than 200 typeface design descriptors that reshape the master font to simulate popular typeface designs. Each master font comprises outlines containing, as control points, all required features to define any of the typeface design style variations supported by the master. Scaling hints are algorithmically generated. The actual typeface does not exist until it is synthesized, thereby reducing data storage requirements.

Infinifont® software modules generate basic letterforms which, when fed Panose® typeface classification system descriptors, produce simulations of a variety of popular typeface designs. Again, scaling hints are algorithmically generated as a post process. As with the FontChameleon® software modules compression technique, the actual typeface does not exist until it is synthesized, thereby reducing data storage requirements.

Compression by Font Factoring:

Careful scrutiny of the data describing a large collection of typefaces reveals a significant amount of redundant information. Removing this redundant information is used to create a more compact, concise data format. This innovative process is called Compression by Factoring, because it is based on the mathematical notion of "factoring" any information that is used repeatedly, storing it once, and sharing it when needed.

Factoring is accomplished at multiple levels by extracting information that is common across varying "cross-sections", or planes, of the total data set. For instance:

1) At the Font Collection Level, information, such as tables that are necessary for each typeface, are stored once, eliminating redundancies, and shared by many of the typefaces (i.e., fonts) in the font collection.

2) At the Typeface Style Level, letterforms have identical topology, and because the scaling hints capture this topology, the same hints are captured in a structure which is applied to each typeface in a given typeface style. This structure is referred to as a Model of Associations between Letterform Features, or simply, Model.

3) At the Typeface Level, common design feature measurements, which are used repeatedly within many characters within that typeface, are extracted, stored once and shared with many characters—examples being y-line heights, stem width, serif lengths, etc.

4) At the individual Character Level, much of the topological information defined in the outline is repeated in the topological information required to capture the scaling hints. By using the topology of the scaling hints to generate the outline, redundant information is eliminated.

5) At the Data Unit Level, within the definition of common typeface measurements (Global Dimensions of Associations), as well as within the definition of measurements specific to a single character (Local Dimensions of Associations), dimension values are mathematically factored to be represented by (i) a common scale factor, which is stored once per typeface, and (ii) a dimension value, whose range is thereby significantly reduced, requiring fewer bits for definition.

6) At the Contour Definition Level, within the definition of contour features specific to a single character (Contour Segment Descriptors), curve control values are ordered and normalized relative to adjacent character features. This reduces the range of their values and likewise reduces data storage requirements.

The basis for Compression by Font Factoring is unique. Where other systems for font compression concentrate on methods to compress the letterform outlines as the primary issue, dealing with the scaling hints as a secondary issue, Font Factoring deals with the letterform and hints as being two inseparable and indistinguishable components of the letterform essence. In fact, the unique approach to font factoring is that the hints, with all their attributes, are used to give form to the otherwise shapeless letterform outline.

To understand how font factoring works, it is helpful to have a basic understanding of font scaling and the hints required to support that process. To begin with, one must keep in mind that typefaces are not designed numerically. Although letterforms appear to be designed with a great deal of consistency, that consistency is visual, not numerical. In fact, in order to achieve visual consistency, it is necessary for typeface designs to be numerically inconsistent in order to overcome the optical illusions created by diverse shapes, stroke directions and stroke intersections. When digitally capturing, scaling and imaging such visual information, much of the nuance specifically introduced to support visual consistency can be lost. In order to preserve the nuance and improve the quality of the letterform scaling process, the technique of intelligent scaling has been developed and implemented. This technique requires an analysis of the letterform shapes in order to capture in data and algorithms the information that will preserve and support the letterform shape and nuance during scaling. This information has come to be called "scaling intelligence", "scaling hints" or simply "hints".

Under Intellifont®/MicroType® font compression technologies, improved scalability of a character's contours is achieved by a character's scaling intelligence in the form of:

(1) A subset of key points on the character contour, designated skeletal points, which must maintain some established relationship to the bitmap grid—as well as to other skeletal points in the character. Each skeletal point represents a key character feature.

(2) Specifically assigned associations between these skeletal points, for the purpose of maintaining important internal character relationships.

(3) Classification of skeletal points by their external relationship to key vertical addresses or Y-lines.

This additional "intelligence" provides Intellifont®/MicroType® font compression technology scaling algorithms with the necessary information to control a character's internal order as the character is scaled and translated to a bitmap. In the case of Intellifont® font compression technology, this additional intelligence is applied to the character outline during scaling. In the case of the MicroType® font compression technology algorithm, this additional intelligence supports the actual creation of the letterform outline.

Character Height Alignment Relative to Y-Lines:

Because of their intentionally designed variations, character heights often round inappropriately to create misaligned characters when left unmaintained. Therefore, the intelligent scaling process establishes control over a defined set of key horizontal lines (Y-lines) in the typeface. This is accomplished such that internal character forms maintain correct internal proportion.

To this end, specific segments along character contours are assigned to defined "bands," called Y-classes, which run horizontally from character to character through a line of text. A typical band is defined by two Y-lines—such as the Y-value of the baseline and the Y-value of the lowercase x-height. Character features which are visually related to each of these Y-classes are assigned to them through the hints.

X/Y Associations:

As scaling takes place, certain internal dimensional relationships in a character design must remain consistent in relation to one another. However, due to rounding errors inherent in the representation of (analog) artwork as discrete pixels, such dimensional relationships are often lost. Because of this, a means for controlling internal relationships during scaling is provided. These dimensional relationships are established by "linking" pairs of associated skeletal points.

For example, a skeletal point defining the left side of a character stem is linked to the associated skeletal points on the right side of the stem because of the visual association between each side of a stem. Consistently applied to all similar character features, such associations ensure the consistent handling of these features during scaling.

Sequencing of Character Associations:

Not all character dimensional relationships can be controlled as scaling and manipulation take place. Some dimensional relationships must be allowed to vary so that others can be maintained. For example, if the two stems and the overall width of a lowercase "n" are controlled by associations, then the counter of the character, i.e., the space between two stems, must be allowed to vary from its original design; otherwise there is an unresolvable conflict. It is best to provide some compromise in controlling character dimensional relationships by exercising partial constraint over certain dimensions. This is determined by the sequencing of skeletal point associations to form a tree structure relationship between all skeletal points. Therefore, the sequence in which skeletal processing takes place is important, and is captured in the skeletal tree.

SUMMARY OF THE INVENTION

As font data is analyzed, compressed and then re-analyzed, it becomes apparent that the relative concentration of specific types of data within the entire font data set shifts. Font data types that were once thought to be an insignificant portion of the data now show increased proportion relative to data types which have been successfully compressed. In addition, techniques to reduce or compress one type of data have had the effect of actually increasing other types of data.

The present invention is aimed at three data areas of font compression, the size of which has become significant as other data areas have been compressed using MicroType® font compression technology method of compression. The three data areas include Model Factoring, Character Level Feature Measurement (Local Dimensions) factoring, and Typeface Level Feature Measurement (Global Dimensions) factoring. In general, the invention in each area is an apparatus and method used in font compression to reduce redundant information, thereby allowing a reduction in data format (e.g., words to bytes and bytes to bits) resulting in an overall reduction in storage area for a given font collection.

One aspect of the present invention is a method of model factoring for reducing the storage size for a collection of fonts. This method comprises providing a collection of fonts, including a plurality of letterforms, and a library of models defining a plurality of shapeless closed loop structures, where the structures compose a frame-work for the letterforms. The models are factored into (i) a core set of associations applied across the library of models, and (ii) an extension set of associations specific to individual models. The method then stores the factored sets of associations to a data storage area.

Another aspect of the present invention is, in a computer, a method for model factoring for reducing the storage size for a collection of fonts. The method comprises defining a collection of fonts. The collection of fonts includes a set of characters for each of the fonts, where each character has a set of associations. Each set of associations is represented by a model of associations shared by similar characters across a subset of fonts. The model of associations is a member of a set of models shared by the set of fonts in the collection. A core set of associations is extracted for those models, that contain a subset of identical associations. The core subset of associations is stored for the subsets of models; model-specific information is stored for each of the models in this subset of models, whereby storing the core set of associations separate from the model-specific information results in a storage size reduction for the collection of fonts.

Extracting the core set of associations includes two steps. First, a set of associations is defined for characters common across the collection of fonts. Second, the set of associations are factored into a model-style data set and a model-specific data set. Storing the core set of associations also includes two steps. First, the core set of associations are converted into a data storage medium compatible format. Second, the core set of associations are stored in a data storage medium.

Another aspect of the present invention is an apparatus that uses font information. The apparatus includes a data storage medium, storing: a collection of fonts having a set of characters for each of the multiple fonts; a set of font-specific character information for each of the fonts; a set of models composed of associations factored into a core set and extension set; and, a core set of model information that is generic to a subset of models. The apparatus also includes a processor for storing the sets of model information to the data storage medium. Storing the core set of model information results in a storage size reduction for the collection of fonts. The processor converts the collection of fonts into a data storage medium compatible format prior to storing the sets of model information to the data storage medium.

Another aspect of the present invention is an apparatus that uses font information. The apparatus comprises a data storage medium, storing: a collection of fonts, where each font comprises a plurality of characters for each of the fonts; a collection-wide model having factored font-wide character information; a font-specific model having character-wide character information; and, a character-specific model having character-specific character information. A combination of models reduces character information, thereby reducing the storage size for the collection of fonts.

The font-wide character information includes a base value and character-wide character information. The character-wide character information includes character-specific character information having specific values. In the preferred embodiment of the present invention, the character information is normalized. The apparatus for character level feature measurement factoring further includes, font-specific character-specific skeletal association information corresponding to the font-wide character-specific association information.

Another aspect of the present invention is, in a data storage and retrieval system, a method of character level feature measurement factoring for generating a collection of fonts. First, a plurality of font information is provided for a collection of fonts. Each font comprises a plurality of characters, where each character includes a plurality of skeletal associations. Second, a first set of skeletal association information is loaded. The skeletal association information is generic to a subset of fonts. Third, a second set of skeletal association information is loaded. The second set of skeletal association information has character-specific information for at least one font. Fourth, the first and second sets of skeletal association information are combined. The combination generates a plurality of font-specific character-specific skeletal associations, which are used for generating the collection of fonts.

The first set of skeletal association information includes a base value for corresponding skeletal associations. The second set of skeletal associations includes encoded values for a corresponding skeletal association. Combining the first and second set of skeletal associations is performed according to the formula: $dimValX^y = ((baseValue + encodeValX^y) * standardScale^y)/256$, $y = 1, 2, \ldots n$; where baseValue is a factored skeletal association value in said first set corresponding to the dimension being calculated; $encodeValX^y$ is a remaining specific skeletal association value in said second set corresponding to an actual normalized local value corresponding to the dimension being calculated; and standardScale$^y$ is a predetermined normalizing value.

Another aspect of the present invention method is an apparatus that uses font information. First, the apparatus includes a collection of fonts having a set of characters for each of the multiple fonts. Each character has a plurality of character dimensions. Second, the apparatus includes a first set of character information having font-wide character dimension information for the collection of fonts. Third, the apparatus includes a second set of character information having font-specific character dimension information for each of the multiple fonts. Fourth, the apparatus includes a data storage medium on which the collection of fonts and first and second sets of character information are stored. Fifth, the apparatus includes a processor coupled to the first and second sets of character information and to the data storage medium. The processor stores to the data storage medium (i) a subset of font-wide character dimension information in the first set of character information, and (ii) a subset of font-specific character dimension information in the second set of character information.

The dimensions are arranged in a consistent order for each font in the collection of fonts. For each dimension across the plurality of fonts in the font collection, the first set includes a base value and a range of deviations and the second set includes a deviation. Alternatively, for each font in the font collection across the plurality of dimensions, the first set includes an index and a range of differences, and the second set includes only differences.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like-referenced characters refer to the same parts throughout the different views. The drawings are not necessarily to scale, emphasis instead being placed upon illustrating the principles of the invention. Of the drawings:

FIG. 5 is a tree structure of core associations for the section marks in FIGS. 2, 3, and 4;

FIG. 6A is a tree structure of extension associations for the section mark in FIG. 2;

FIG. 6B is a tree structure of extension associations for the section mark in FIG. 3;

FIG. 6C is a tree structure of extension associations for the section mark in FIG. 4;

FIGS. 8A and 8B show a schematic diagram of a model factoring process, as in FIGS. 2–5, and 7; a character level feature measurement (local dimensions) factoring process; and a typeface level feature measurement (global dimensions) factoring process;

FIG. 9 is a flow diagram depicting a processor routine, which operates on a CPU of FIG. 1, for reconstructing the factored data in the model factoring embodiment into the "I" models of FIGS. 10A and 10B;

FIG. 12 is a global dimension table for all typefaces 20 in a font collection 10 of FIG. 8 composed of a deviation from a base value or as a deviation from a parent value.

DETAILED DESCRIPTION OF THE INVENTION

Figure 1:
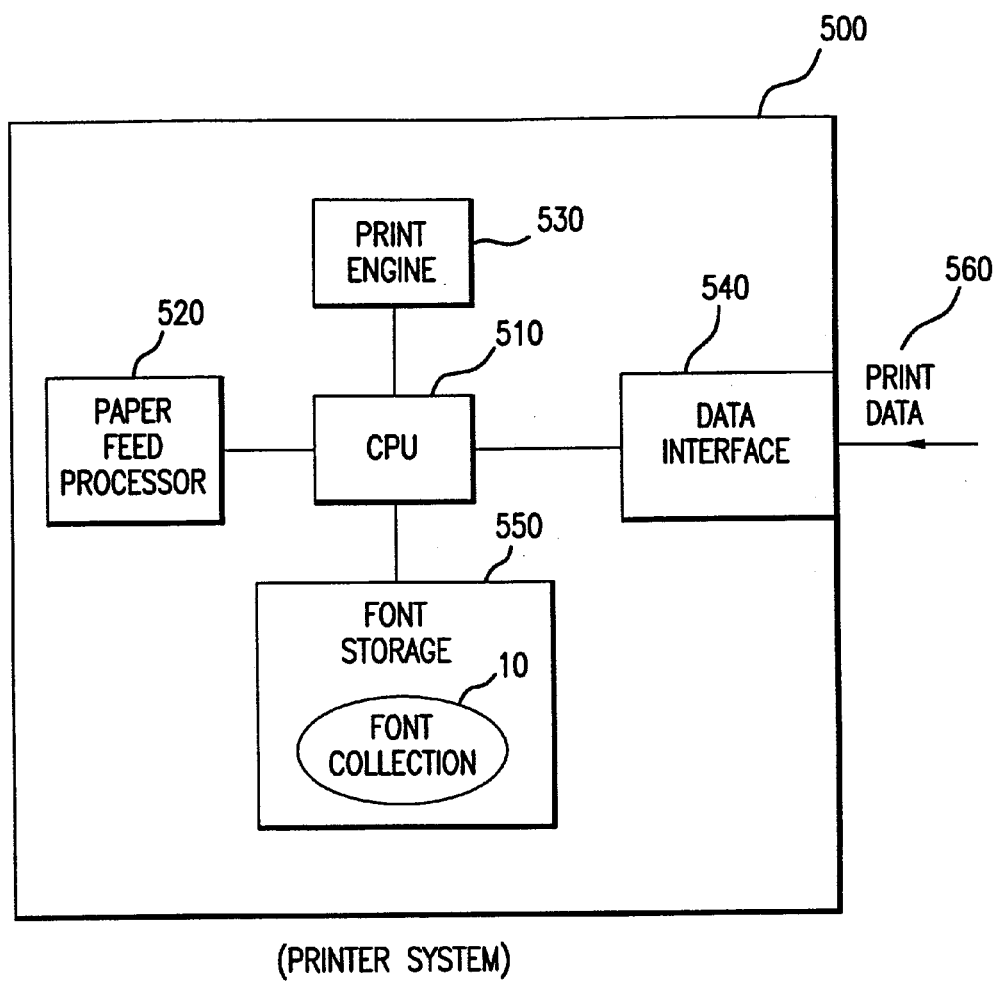
FIG. 1 is a block diagram of a printer system in which embodiments of the present inventions are deployed.

Definitions:

| | |
|---|---|
| Skeletal Association: | A term used to describe the natural visual relationship between notable features (skeletal nodes) in a letterform. An example of such a skeletal association is that between the left and right sides of the any vertical letterform stem. |
| Character: | A single glyph, symbol or letterform, which, together with other glyphs, forms a typeface. |
| Contour Segment Descriptor: | A single section of an outline which describes the perimeter of a letterform. Within the MicroType ® font compression technology, these contour segment descriptors support the shape of the letterform along the contour between two character features (skeletal nodes). |
| Feature Measurement: | A measured numeric distance between two letterform features which have been declared as visually associated. See Skeletal Association. |
| Font Collection: | A single data set comprising all the data required to support one or many typefaces (fonts). |
| Global Dimension: | A numeric quantity corresponding to a fixed distance across a skeletal association, which is found in more than one letterform or found in more than one location in a single letterform. An example of such a dimension is the distance across a straight vertical letterform stem of all uppercase characters in a given typeface. The distance is considered to be applied globally across all such characters. |
| Letterform Feature: | A term used to describe a notable "moment" along the a letterform's perimeter, such as its vertical and horizontal extremes, sides of its vertical stems, ends of its serifs, bounds of its counters, etc. These features are captured as skeletal nodes. |
| Library of Models: | A collection of all the models required to support a defined set of letterforms. See Letterform Model. |
| Local Dimension: | A numeric quantity corresponding to the fixed distance across a skeletal association which is found in only one location in one character. The distance is considered to be applied locally within that one character. |
| Letterform Model: | A generic letterform description which captures the general shape of a given glyph and from which several such glyphs, each residing in a different typeface, can be formed. The letterform model comprises a set of skeletal associations between letterform features. The associations are organized in a tree-like structure. The model has no local or global dimension measurement information. A specific glyph in a specific typeface is formed by applying to the model the appropriate local dimension measurements from that glyph, along with the global dimension measurements from that typeface. The application of these fixed distances to the model gives a fixed shape to the otherwise shapeless letterform. |
| Normalization: | A process of mapping a set of numeric quantities to be represented within a consistent scale. |
| Scalable Outline: | A data representation of a perimeter of a letterform capable of being rendered over a range of point sizes and resolutions. |
| Scaling Hints: | A data representation of key letterform features and feature relationships. This data is capable of protecting and enhancing those feature relationships during a scaling of the letterform over a range of point sizes and resolutions. |

-continued

Definitions:

| | |
|---|---|
| Skeletal Node/Node: | A point marking a notable feature along the letterform outline. The skeletal node serves a purpose of breaking the letterform contour into segments. The node provides support for the ends of the contour segment descriptors, as well as locations of notable letterform features along the contour which are linked, or associated, by the skeletal associations organized in the skeletal tree. |
| Skeletal Tree: | An organization of the skeletal nodes, their relative associations and attributes forming a tree-like structure that supports the processing of a letterform model to produce a decompressed letterform at variable point sizes and resolutions. Within the skeletal tree there exists one or more root skeletal nodes that have a relationship, through skeletal associations, to other skeletal nodes, which, in turn, have relationships to still other skeletal nodes within the character. By traversing the tree, a process can touch each node, and thereby control each and every notable letterform feature in the character. |
| Skeletal Tree Core: | A subset of the nodes, associations and related attributes that make up that part of the skeletal tree, which is common to several letterform models of a specific glyph form. |
| Skeletal Tree Extension: | The subset of nodes, associations and related attributes that remain in a letterform model after the skeletal tree core has been removed. |
| Topology: | The relative position and scale of the contour segments in a letterform, which give the letterform its shape. |
| Typeface: | A collection of unique alpha-numeric symbols in a single visually compatible design or font. |
| Typeface Family: | A collection of several typefaces of the same design in a variety of weights and widths. |
| Y-line: | A horizontal line visually formed by the consistent vertical alignment of letterform parts when characters are imaged in a line of text. An example is the Cap Height Y-line which indicates the top alignment of the uppercase Roman characters. |

FIG. 1 is a schematic diagram of a printer 500 in which a printer manufacturer includes a font storage device 550, such as a ROM or EEPROM.

In the printer 500, a CPU 510 is coupled to a print engine 530, paper feed processor 520, data interface 540, and font storage device 550. The data interface 540 receives print data 560 from a data device, such as a computer or computer network. The received print data 560 is transmitted to the CPU 510.

The CPU 510 parses the print data 560 to locate text, which the CPU 510 converts into printable characters based on a selected font. The CPU 510 has knowledge of how to convert the print data 560 into printable characters from the information included in the font storage device 550, namely a font collection 10. The CPU 510 provides scaling, style, and other font changes to the print data 560 before sending the print data to the print engine 530; therefore, the font storage device 550 is minimized if the font collection information contained therein is generic, allowing the CPU 510 to perform scaling, style, etc. operations on the font collection information.

To reduce font collection data to enable a reduction in the size of the font storage device 550 while maintaining generic font collection information to allow the CPU 510 to perform the actions described above, the font collection 10 stored in the font storage device 550 in accordance with the principles of the present invention includes data resulting from at least one of three font compression or factoring techniques, namely: model factoring, character level feature measurement (local dimensions) factoring, and typeface level feature measurement (global dimensions) factoring. The CPU 510 provides a process for loading the font collection data and reconstructing the font collection to facilitate print data 560 printing.

1) Model Factoring:

A model of associations (as in FIGS. 2, 3, and 4) that defines a character's topology provides a basis for a font compression by factoring. The model is a "frame-work" on which all other data items are "hung" and from which all character shapes are built. A given model provides a structure for a character's shape, as well as its scaling hints for producing resolution independent output.

Careful analysis and organization renders a library of models that are concise. A single model for a specific letterform topology often is used for many typefaces, also referred to as fonts, of similar design style. A model for a section mark (§) (FIG. 2) with bracketed serifs can be shared by many typeface designs regardless of weight, stress, height, width. However, it cannot be effectively shared by section marks with slab serifs (FIG. 3), ball terminals (FIG. 4) or no serifs. As a result, a library of models must be expanded with unique models to support alternate forms of the section mark, even though the basic topology, that of "section-mark-ness", is identical.

One aspect of the present invention reduces the size of the library of models by "factoring" the models themselves. The intent is to capture a core set of associations within a group of models. This core set of associations is identical and thereby serves as the core of the alternate forms of models for certain letterforms. For example, the core associations (as shown in tree form in FIG. 5), which capture the topology of the very basic section mark, referred to as "section-mark-ness", is used to define any section mark, regardless of weight, stress, height, width, and now serif style (or lack thereof), and even italic angle in many instances. The extension associations, as shown in FIGS. 6A, 6B, 6C, capture the topology of the slight letterform variations and are used with specific section-mark designs to render the FINAL and specific shape.

Where the MicroType® font compression technology uses the model of associations to give final form to a "shapeless closed-loop" comprising the letterform, the present model factoring uses a subset of common associations in the model group to give general form to part of the "shapeless closed-loop". After part of the shapeless closed-loop model is formed, the present invention uses associations specific to a particular design model (e.g., bracketed serifs (FIG. 2), slab serifs (FIG. 3), ball terminals (FIG. 4) or no serifs) to give final form to the remainder of the shapeless closed-loop.

Figure 2:
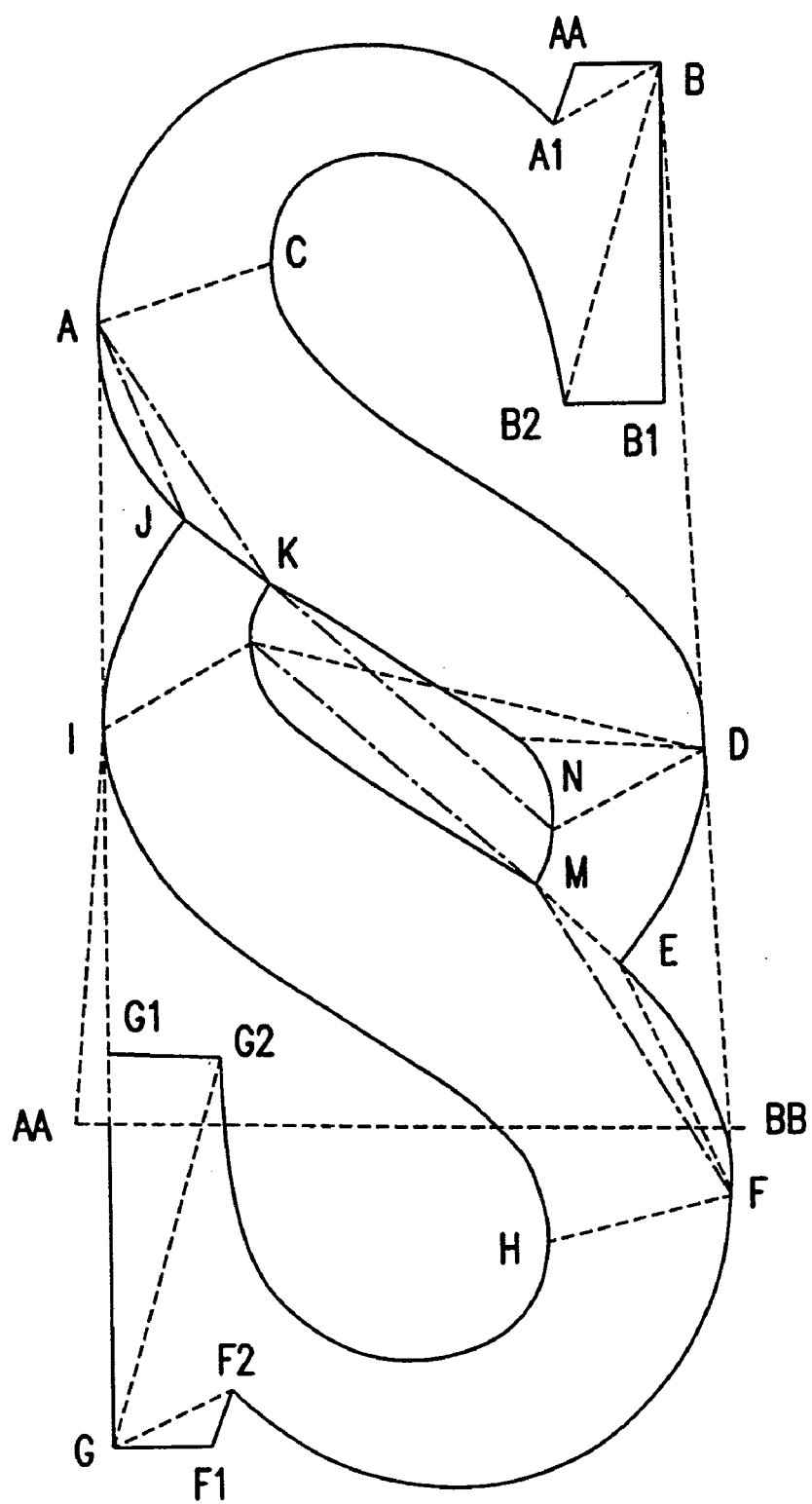
FIG. 2 is a model of a section mark with "bracketed serifs" showing associations.

FIG. 2 is a model of a section mark (§) with "bracketed serifs." In the model, solid lines compose the section mark model; dashed lines are skeletal associations (also referred to as associations), each interconnecting a pair of skeletal nodes positioned at various but significant points about the section mark. A capital letter references a respective skeletal node for purposes of discussion.

The skeletal associations interconnect the skeletal nodes in a preferred sequence. Roughly in an order shown in FIG. 5, node AA is a "parent" of node BB, where the term "parent" indicates hierarchical superiority. Conversely, a term "child" refers to being hierarchically subordinate (to the parent). Node AA is also the parent of node I. Node I is the parent of nodes A, L, and G, which are therefore "siblings" of each other. The term "sibling" refers to being hierarchically equivalent. Node A is the parent of nodes C, J, and K. Node L is the parent of nodes D, M, and E. Node D is the parent of nodes N, B, and F. Node N is the parent of nodes J and K. Node B is the parent of node B2. Node F is the parent of nodes H, M, and E. Node G is the parent of node G2. These relationships provide a core set of associations that also apply to the core set of associations of the section marks in FIGS. 3 and 4.

In the section mark of FIG. 2, and shown in FIG. 6A, associations beyond this core set are: node B is the parent of nodes A1, A2, and B2; node G is the parent of nodes G2, F1, and F2. Note that some dashed lines are hidden by the solid lines of the model in certain cases; for example, G to F1 and B to A2. In the preferred embodiment of the present invention, in the cases of purely horizontal and vertical skeletal associations, an alternative data reduction method is employed that is specifically designed for single-axis association vectors due to its superior efficiency.

Figure 3:
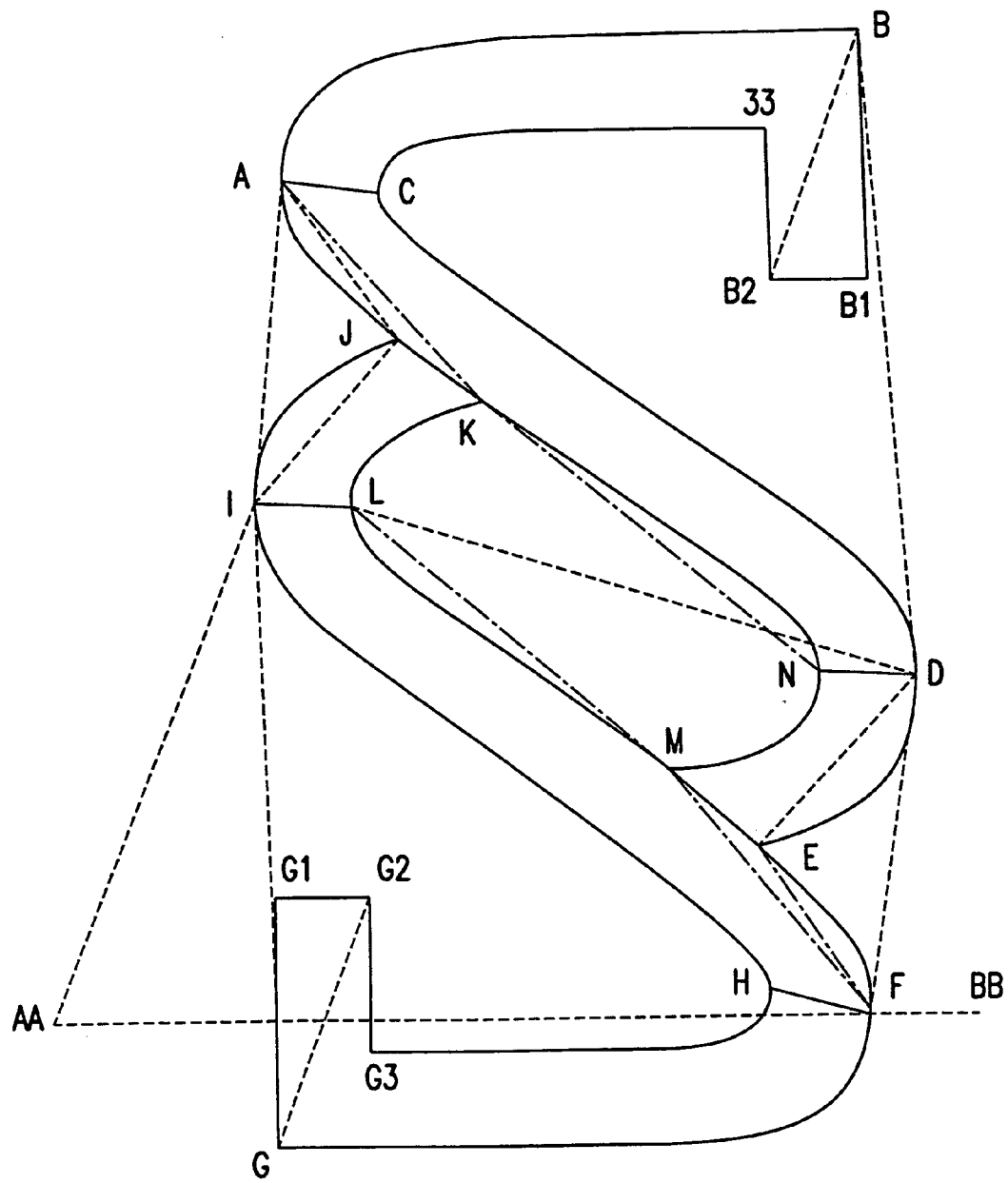
FIG. 3 is a model of a section mark with "slab serifs" showing associations.

FIG. 3 is a model of a section mark (§) with "slab serifs." As in FIG. 2, the solid outline indicates the model. The dashed lines are skeletal associations interconnecting pairs of skeletal nodes in the section mark letterform, where the skeletal nodes are represented by capital letters.

A subset of skeletal nodes and corresponding associations are included in the core set of skeletal associations, as discussed in FIG. 2 and shown in FIG. 5. In the section mark of FIG. 3 and shown in FIG. 6B, skeletal associations beyond this core set are: node B is the parent of node B1; node B2 is the parent of nodes B3 and B1; node G2 is the parent of nodes G3 and G1. Other aspects of similarities and differences between FIG. 3 and FIG. 2 may be determined empirically.

Figure 4:
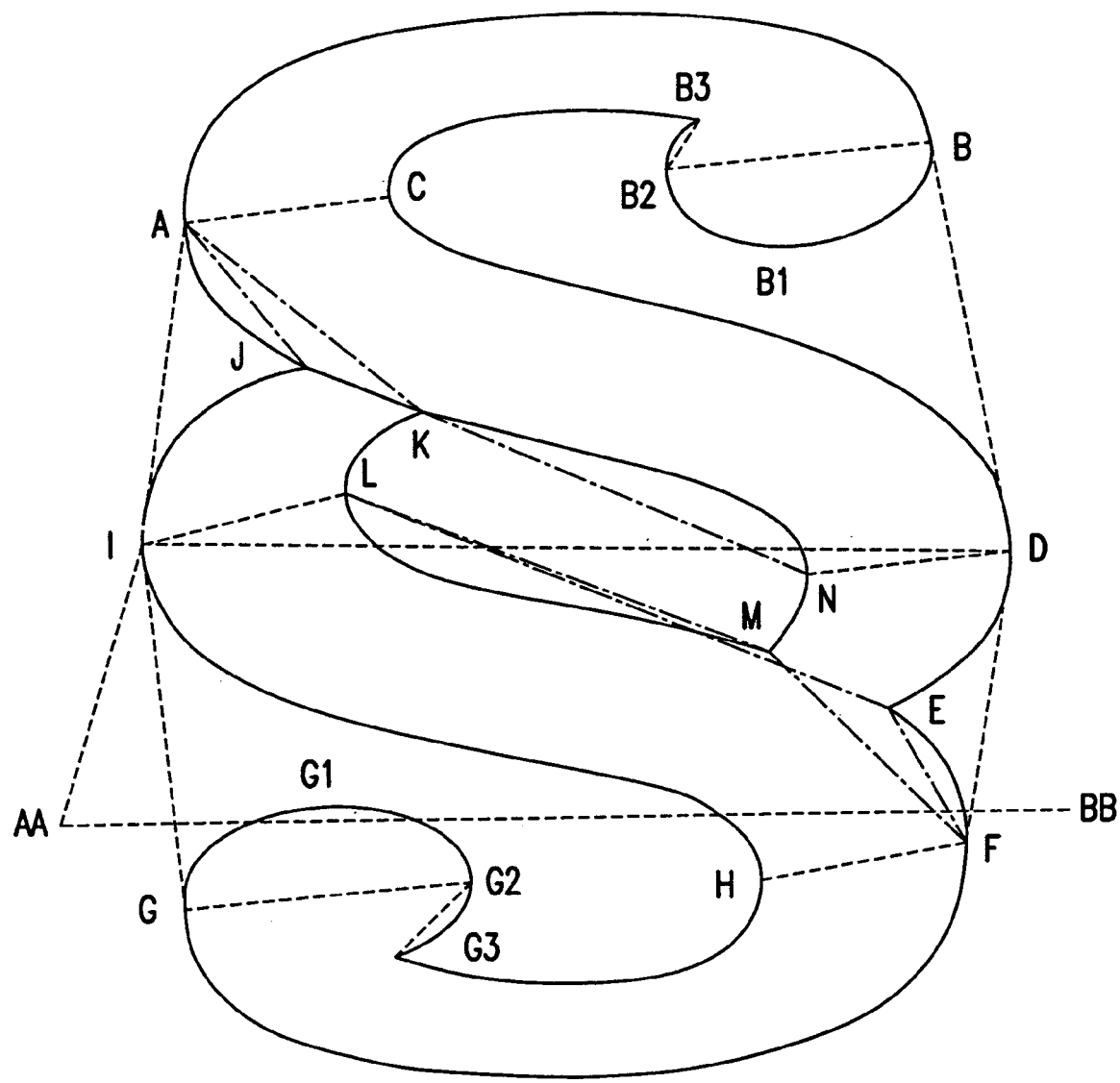
FIG. 4 is a model of a section mark with "ball terminals" showing associations.

FIG. 4 is a model of section mark (§) with "ball terminals." As in FIG. 2, the solid outline indicates the model. The dashed lines are skeletal associations interconnecting pairs of skeletal nodes in the section mark letterform, where the skeletal nodes are represented by capital letters.

A subset of skeletal nodes and corresponding associations are included in the core set of skeletal associations, as discussed in FIG. 2 and shown in FIG. 5. In the section mark of FIG. 4 and shown in FIG. 6C, skeletal associations beyond this core set are: node B2 is the parent of nodes B1 and B3; node G2 is the parent of nodes G1 and G3. Other aspects of similarities and differences between FIG. 4 and the prior discussed FIGS. 3 and 2 may be determined empirically.

FIG. 5 is a tree structure of core associations for the section marks of FIGS. 2, 3, and 4. Interconnecting arrows represent associations. The letters correspond to the letter designations of the skeletal nodes of FIGS. 2–4. Skeletal node representations have an arrow between them to indicate a parent/child relationship (e.g., node AA is the parent of node BB, which is a child of node AA; node AA is also the parent of node I, which is a child of node AA). Skeletal node representations listed in a same column and stemming from a same parent indicates a sibling relationship; for example, skeletal nodes C, J, and K are siblings. Arrows pointing to the right and starting downward then pointing to the right from a skeletal node representation have the same function and meaning; using both arrow types is just a convenient way for concisely drawing the tree structure of FIG. 5.

Figure 7:
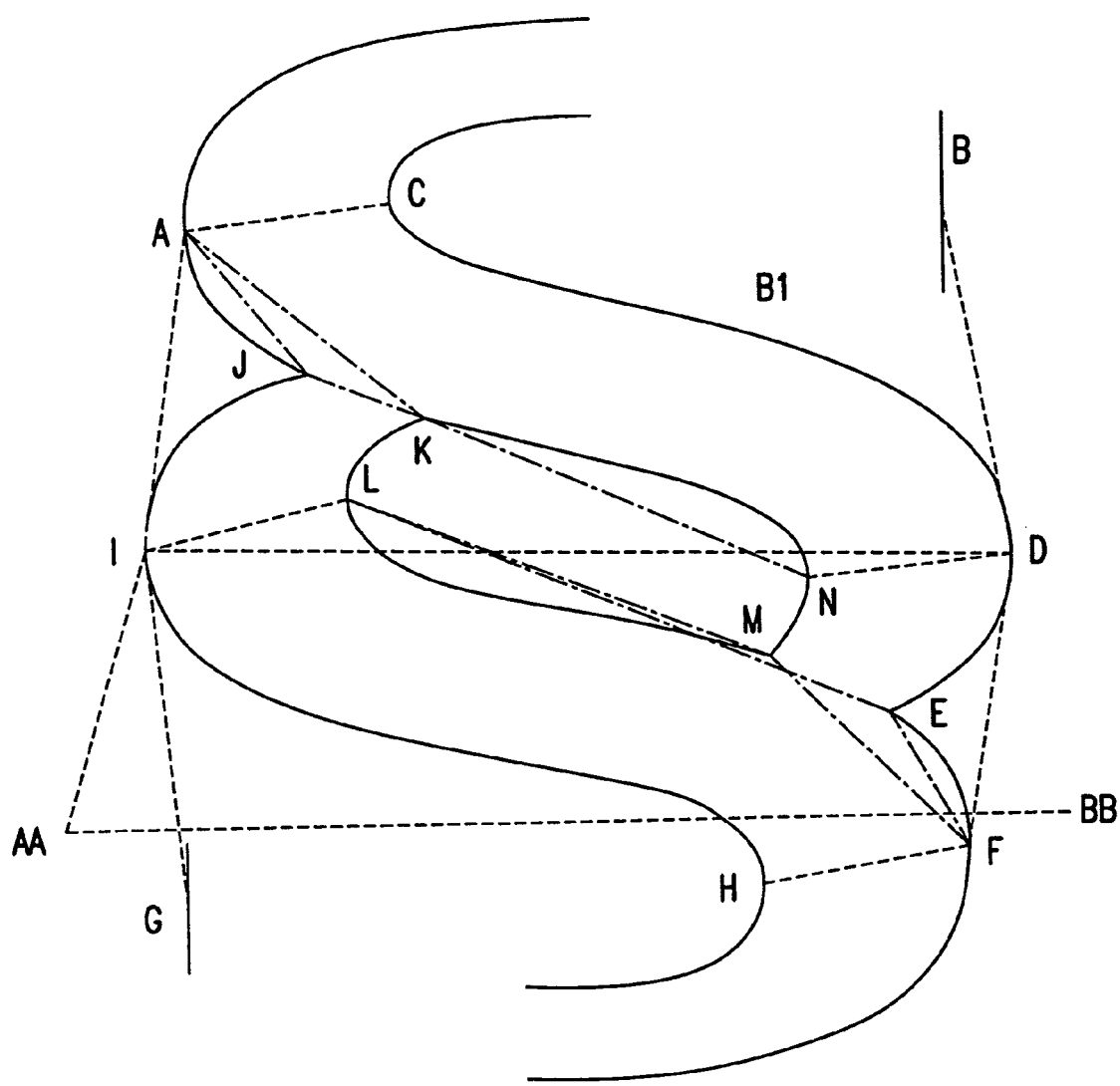
FIG. 7 is a subset of associations, which are common across the section marks of FIGS. 2, 3, and 4, and have the tree structure shown in FIG. 5.

FIG. 7 is a subset of associations that are common to the section mark models of FIGS. 2, 3, and 4, respectively; this common subset of skeletal nodes and skeletal associations are referred to as the skeletal core. Unlike the closed-loop model structures of the section mark models of FIGS. 2–4, the core structure of FIG. 7 is an open-loop structure. In other words, the bracketed serifs, slab serifs, and ball terminals that close the models in FIGS. 2, 3, and 4, respectively, are not included in the core model since the skeletal node and association configuration for each serif is not common across all section mark models. Therefore, the top and bottom ends of the core section mark (beyond the A–C and F–H skeletal associations, respectively) are said to be "open".

Figure 8B:
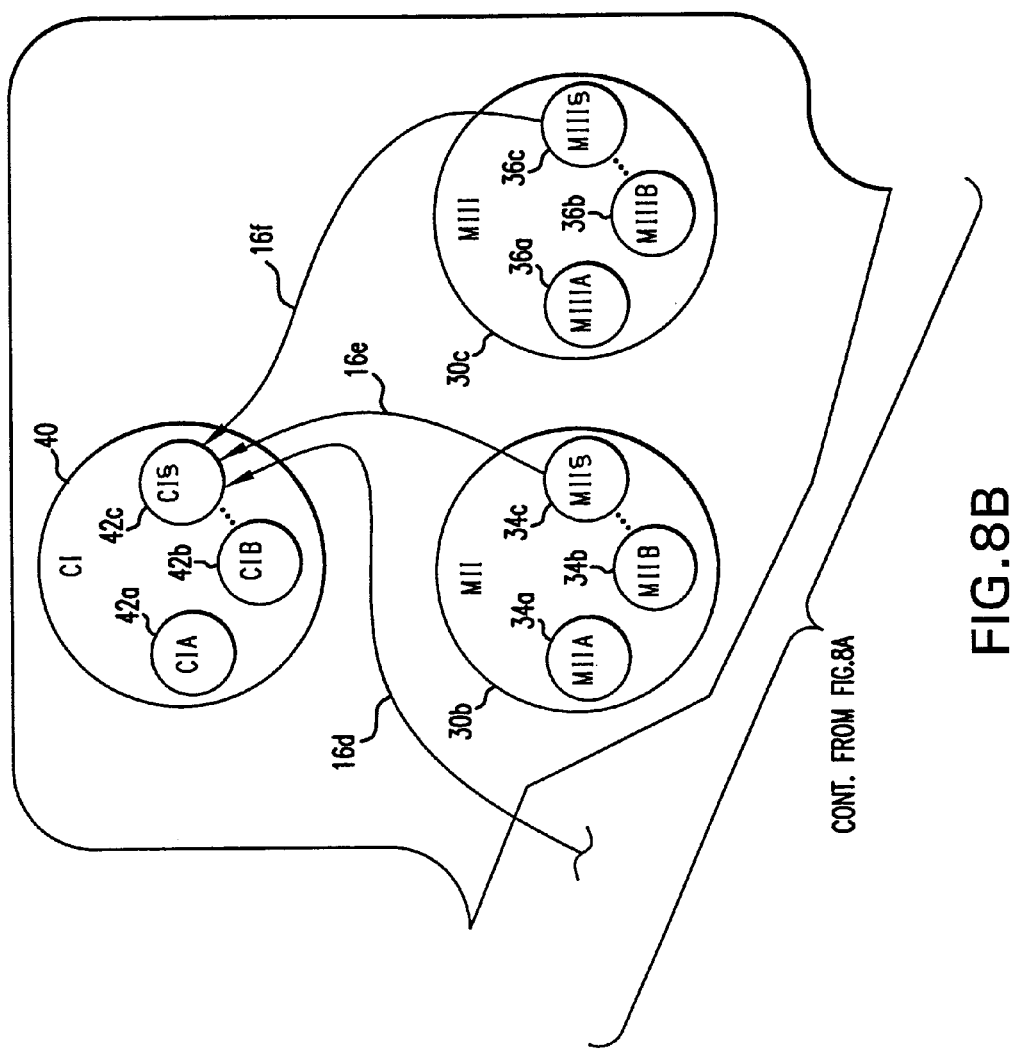

FIGS. 8A and 8B show a schematic diagram that includes an embodiment of a model factoring process, a character level feature measurement (local dimensions) factoring process, and a typeface level feature measurement (global dimensions) factoring process. Aspects of the prior art are indicated by dashed arrows; aspects of the present invention are indicated by solid arrows.

Referring to the model factoring process, the font collection 10 includes a TFI 20a (typeface I 20a), TFII 20b, and TFIII 20c, collectively 20. The font collection 10 further includes an MI 30a (model I 30a), MII 30b, and MIII 30c (collectively 30). Font collection 10 further includes a CI 40 (core I 40).

Each typeface 20 includes letterforms (LFs). TFI 20a comprises LFIA 22a (letterform I of a capital "A"), LFIB 22b, and LFI§ 22c (collectively 22). TFII 20b includes LFIIA 24a, LFIIB 24b, and LFII§ 24c (collectively 24). TFIII includes LFIIIA 26a, LFIIIB 26b, and LFIII§ 26c (collectively 26). Letterforms include indications of hints (H) (e.g., 23a, 25a, 27a), and indications of contours (c) (e.g., 23b, 25b, 27b).

The models 30 include a plurality of letterform models. MI 30a includes a model of a capital "A" (MIA 32a), capital "B" (MIB 32b) and section mark (MI§ 32c). MII 30b includes a model of a capital "A" (MIIA 34a), capital "B" (MIIB 34b) and section mark (MII§ 34c). MIII 30c includes a model of a capital "A" (MIIIA 36a), capital "B" (MIIIB 36b) and section mark (MIII§ 36c).

The MI 30a letterform model MI§ 32c includes a subset of skeletal node information from LFI§ 22c, LFII§ 24c, and LFIII§ 26c, as indicated by links 16a, 16b, and 16c, respectively. The MI 30a MI§ 32c is, for example, a model for section marks having bracketed serifs; therefore, letterforms 22c, 24c, and 26c all have letterforms with bracketed serifs.

The CI 40 includes a plurality of core models, including CIA 42a, CIB 42b, and CI§ 42c, collectively 42. In accordance with the discussion of FIG. 5, the core models 42 comprise subsets of skeletal nodes that are common to corresponding letterform models from a subset of models 30. For instance, CI§ 42c includes subsets of skeletal nodes and associations from MI§32c, MII§ 34c, and MIII§ 36c, as indicated by links 16d, 16e, and 16f, respectively. Likewise, though not shown, CIA 42a and CIB 42b include model 30 subsets of skeletal nodes in a similar fashion.

FIG. 9 is a flow diagram of the model factoring process that is implemented in at least one processor routine, which operates on the CPU 510 (FIG. 1). The model factoring process uses as input: (1) core data to describe the general shape of a letterform, and (2) extension data to describe its final shape. The model factoring process processes the two sources of data to produce a single data set. Using this method, a collection of model data required to render all design variations of a particular letterform is reduced by the number of model associations that are common to all. Those common associations are extracted from each model, stored once, and shared among various models to render versions of a letterform in various typeface styles and designs.

The process begins by declaring variables and initializing those variables in step 300. One variable initialized in the initialization step 300 is a core mode variable. The core mode variable is set to a Boolean true value, thereby assuming that a subset of skeletal nodes processed are core skeletal nodes. As part of the initialization, a pointer to the first skeletal node is created as the current node. The current pointer is pushed on the node stack at step 303.

A core mode query 305 checks the Boolean value of the core mode Boolean variable. If the core mode query 305 is answered "yes", a core node is loaded in step 310 from the core data stream. If the core mode query 305 is answered "no", then an extension node is loaded in step 315 from the extension data stream. After loading a core node in step 310 or an extension node in step 315, a sibling query 320 is performed, which acts on a sibling variable value in the loaded node from either step 310 or 315.

If the sibling query 320 is answered "yes", then a pointer to a sibling node data structure is created in step 325. Step 325 is followed by returning the process to (A) where the created sibling pointer is pushed onto a stack in step 303. If the sibling query 320 is answered "no", then a core mode query 340 is performed.

If the core mode query 340 is answered "yes", then an extension query 345 is performed. The extension query 345 checks a Boolean variable in the extension data stream associated with the current node to determine whether there is to be an extension of the model at this node or not. If the core mode query is answered "no", then the top of the stack is discarded in step 373, and a child node query 375 is performed. The child node query 375 determines whether the current node has a child to be loaded either from the core data stream or extension data stream (dependent on core mode state).

If the extension query 345 is answered "yes", then a "note start of extension" statement is executed in step 350 to track a start of extension nodes in a tree structure being created by the present process. Next, an exit core mode statement is executed in step 355. A pointer to a sibling node data structure is created in step 360. Step 360 is followed by returning the process to (A), where the created extension sibling node pointer is pushed onto the stack in step 303. If the extension query 345 is answered "no", then the top of the stack is discarded in 373, and the child node query 375 is performed.

If the child node query 375 is answered "yes", then a pointer to a child node data structure is created in step 380. Then, the process is returned to (A) where the created child pointer is pushed onto the stack in step 303. If the child node query 375 is answered "no", then a core mode query 395 is performed.

If the core mode query 395 is answered "yes", then an extension query 400 is performed. If the extension query 400 is answered "yes", then a "note start of extension" statement is executed in step 405. The core mode is exited in step 410. An extension pointer to a child node data structure is created in step 415. The process then returns to (A), where the created extension child node pointer is pushed onto the stack in step 303. If the extension query 400 is answered "no", then a stack empty query 430 is performed. If the stack empty query 430 is answered "yes", then the process ends at step 460. If the stack empty query 430 is answered "no", then the current node pointer is set equal to the top of the stack in step 435. A core mode query 440 is performed next.

If the core mode query 440 is answered "yes", then the process is returned to (B), where the top of the stack is discarded in step 373, and the child node query 375 is performed again. If the core mode query 440 is answered "no", then an extension start node query 445 is performed to determine if the process has cycled back to the node at which the extension node was entered.

If the extension start node query 445 is answered "yes", then the core mode is returned to a Boolean true condition in step 450, followed by returning to (B), where the top of the stack is discarded in step 373, and the child node query 375 is executed. If the extension start node query 445 is answered "no", then the process is returned to (B) without returning the process to the core mode (i.e., bypassing step 450). Note that, in this case, the core mode is kept in a Boolean false condition, therefore, nodes being processed before returning to core mode are not part of the core node subset, but of the extension node subset.

This model factoring process embodiment of FIG. 9 continues until all core nodes and extension nodes are put into the tree structure. Example skeletal node and skeletal association structures operated on by the process of FIG. 9 are shown in FIGS. 10A and 10B.

The flow diagram of FIG. 9 may be implemented in any computer program language, such as "C", Pascal, Basic, or Assembly. However, it is preferable to use a programming language that provides linked list data structure capabilities (i.e., direct memory access) rather than only predefined array-type data structures. Linked lists allow for future expansion and reduction of font collection data sizes. Providing a data structure that is flexible in terms of run-time memory usage ensures that only the run-time memory required to support the font collection tree structure is allocated, rather than having to "block off" extra space required by fixed-sized arrays and matrices.

Furthermore, typical type definitions (i.e., char, byte, word, etc.) for memory allocation variables further minimize run-time memory requirements (e.g., using a byte (8-bits) instead of a word (16-bits)). Declaring variables in as memory-efficient format as possible to support the font collection allows a goal of the present invention to be accomplished, which is the reason for performing the factoring described herein.

Figure 10A:
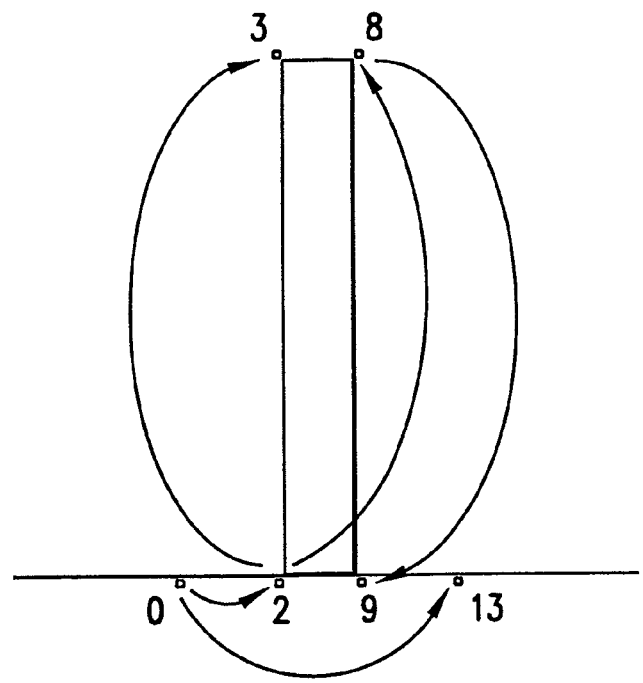
FIG. 10A is a Helvetica "I" with skeletal nodes and skeletal associations to support the core tree process, as in FIGS. 2–5, 7, and 9.
Figure 10B:
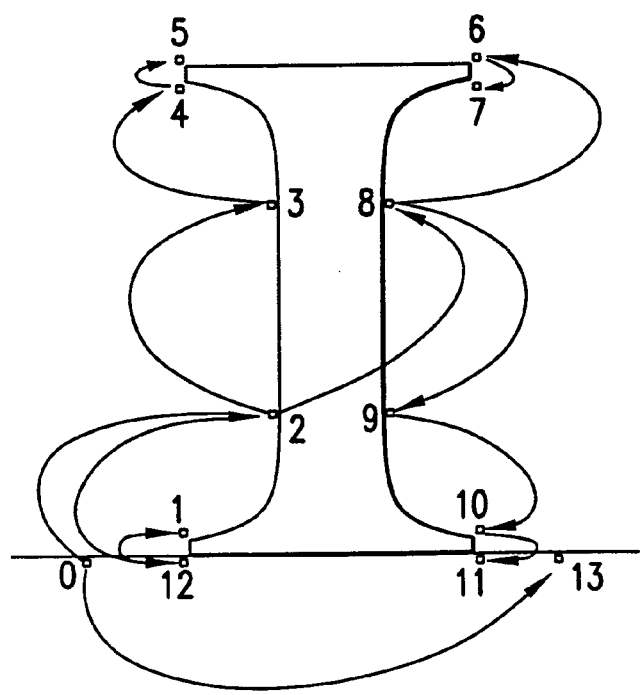
FIG. 10B is a Times New Roman "I" with skeletal nodes and skeletal associations to support the core/extension tree process, as in FIGS. 2–5, 7, and 9.

FIG. 10A is a Helvetica uppercase "I" with skeletal nodes and skeletal associations illustrating a skeletal structure operated on by the CORE/EXTENSION tree process of FIG. 9. A subset of nodes used by the core tree process of FIG. 9 are skeletal nodes 0, 2, 3, 8, 9 and 13, as shown in FIG. 10A. In actuality, these six nodes, which represent the letterform's core, also represent the letterform's entire set of features. Skeletal nodes 12, 1, 4, 5, 6, 7, 10 and 11 are non-existent in this letterform (compare with the Times Roman letterform of FIG. 10B). A description of how a data representation of this illustrated letterform is processed using the process of FIG. 9 follows after a description of FIG. 10B.

FIG. 10B is a Times Roman uppercase "I" with skeletal nodes and skeletal associations illustrating a skeletal structure operated on by the CORE/EXTENSION tree process of FIG. 9. A subset of nodes used by the core tree process of FIG. 9 are skeletal nodes 0, 2, 3, 8, 9 and 13, as shown in FIG. 10A. These six nodes represent the letterform's core. The core plus skeletal nodes 12, 1, 4, 5, 6, 7, 10, 11 constitute the letterform's enitre set of features.

For the letterforms of FIGS. 10A and 10B, there are two data streams feeding the process described in FIG. 9 (1) the CORE data stream which generates the CORE shape of the letterform, and (2) the EXTENSION data stream, which generates the detailed and final shape of the letterform.

A description of how the data representation of the letterforms of FIGS. 10A and 10B using the process of FIG. 9 follows. Note that processing of letterforms in both FIGS. 10A and 10B follow the same paths during the processing of the core skeletal nodes. It is only at those nodes where extensions to the core in FIG. 10B branch off of the core that the two processes differ. For this reason, only one process description follows with comments inserted to show where the two processes, one for Helvetica and one for Times Roman, diverge.

| Helvetica and Times Roman Processes |
| --- |

(FIG. 9 step) (Action)

(300) Initialization:
    Set core mode to YES.
    Initialize stack.
    Create current pointer to node structure.
(A) Begin the process cycle:
The definition and processing of Node 0:

(303) The current pointer is pushed onto the stack.
(305) The core mode? query is answered YES,
(310) causing the population of the current node structure from the CORE data stream. The skeletal node is identified as being Node 0 and having no siblings and at least one child. Its associated attribute data describes its placement as the letterform's left reference. (stack status: top: Pointer to Node 0; Counter: 1)
(320) The sibling? query on Node 0 is answered NO, and
(340) The core mode? query is answered YES, setting the stage for a potential extension at this node.
(345) The extension? query analyzes the forth coming data in the EXTENSION stream to determine if there is an extension at this node 0. The query is answered NO meaning there is NO extension at Node 0.
(B) Enter child processing:
(373) The pointer at the top of the stack is discarded. (stack status: top: empty! counter: 0)
(375) The child? query on Node 0 is answered YES,
(380) causing the creation of a new (current) pointer to a child node structure.
(A) Return to the beginning of the process cycle:
The definition and processing of Node 13:

(303) The current pointer is pushed onto the stack.
(305) The core mode? query is answered YES,
(310) causing the population of the current node structure from the CORE data stream. The skeletal node is identified as being Node 13 and having at least one sibling and no children. Its associated attribute data describes its placement as the letterform's right reference. (stack status: top: Pointer to Node 13; Counter: 1)
(320) The sibling? query on Node 13 is answered YES
(325) causing the creation of a new (current) pointer to a sibling node structure.
(A) Return to the beginning of the process cycle:
The definition and processing of Node 2:

(303) The current pointer is pushed onto the stack.
(305) The core mode? query is answered YES,
(310) causing the population of the current node structure from the CORE data stream. The skeletal node is identified as being Node 2 and having no siblings and at least one child. Its associated attribute data describes its placement as the lower end of the left side of the stem. (stack status: top: Pointer to Node 2; Counter: 2)
(320) The sibling? query on Node 2 is answered NO, and
(340) The core mode? query is answered YES, setting the stage for a potential extension at this node.
(345) The extension? query analyzes the forth coming data in the EXTENSION stream to determine if there is an extension at this node 2. The query is answered NO meaning there is NO extension at Node 2.
(B) Enter child processing:
(373) The pointer at the top of the stack is discarded. (stack status: top: Pointer to Node 13; Counter: 1)
(375) The child? query on Node 2 is answered YES,
(380) causing the creation of a new (current) pointer to a child node structure.
(A) Return to the beginning of the process cycle:
The definition and processing of Node 3:

(303) The current pointer is pushed onto the stack.
(305) The core mode? query is answered YES, -continued (310) causing the population of the current node structure from the CORE data stream. The skeletal node is identified as being Node 3 and having at least one sibling and no children. Its associated attribute data describes its placement as the upper end of the left side of the stem. (stack status: top: Pointer to Node 3; Counter: 2)
(320) The sibling? query on Node 3 is answered YES
(325) causing the creation of a new (current) pointer to a sibling node structure.
(A) Return to the beginning of the process cycle:

The definition and processing of Node 8:

(303) The current pointer is pushed onto the stack.
(305) The core mode? query is answered YES,
(310) causing the population of the current node structure from the CORE data stream. The skeletal node is identified as being Node 8 and having no siblings and at least one child. Its associated attribute data describes its placement as the upper end of the right side of the stem. (stack status: top: Pointer to Node 8; Counter: 3)
(320) The sibling? query on Node 8 is answered NO, and
(340) The core mode? query is answered YES, setting the stage for a potential extension at this node.

| Helvetica Process | Times Roman Process |
|---|---|
| (345) The extension? query analyzes the forth coming data in the EXTENSION stream to determine if there is an extension at this node 8. The query is answered NO meaning there is NO extension at Node 8. | (345) The extension? query analyzes the forth coming data in the EXTENSION stream to determine if there is an extension at this node 8. The query is answered YES meaning there is an extension at Node 8 . . . |
| | (350) Causing the Start of the Extension to be noted as the top of the stack, which is the Pointer to Node 8. |
| | (355) The status of core mode is set to NO. |
| | (360) A new (current) pointer to a sibling node structure is created. |
| | (A) Return to the beginning of the process cycle: |

The definition and processing of Node 12:

(303) The current pointer is pushed onto the stack.
(305) The core mode? query is answered NO,
(315) Causing the population of the current node structure from EXTENSION data stream. The skeletal node is identified as being Node 12 and having no siblings and at least one child. Its associated attribute data describes its placement as the lower left edge of the bottom left serif. (stack status: top: Pointer to Node 12; Counter: 4)
(320) The sibling? Query on Node 12 is answered NO, and
(340) The core mode? query is answered NO, meaning there is no Opportunity for extension because we are already in extension mode.

(B) Enter child processing:
(373) The pointer at the top of the stack is discarded. (stack status: top: Pointer to Node 8; Counter: 3)
(375) The child? Query on Node 12 is answered YES,
(380) causing the creation of a new (current) pointer to a child node structure.
(A) Return to the beginning of the process cycle:

The definition and processing of Node 1:

(303) The current pointer is pushed onto the stack.
(305) The core mode? query is answered NO,
(315) causing the population of the current node structure from EXTENSION data stream. The skeletal node is identified as being Node 1 and having no siblings and no children. Its associated attribute data describes its placement as the upper left edge of the bottom left serif.
(stack status: top: Pointer to Node 1; Counter: 4)
(320) The sibling? Query on Node 1 is answered NO, and
(340) The core mode? query is answered NO.
(B) Enter child processing:
(373) The pointer at the top of the stack is discarded. (stack status: top: Pointer to Node 8; Counter: 3)
(375) The child? Query on Node 1 is answered NO.
(395) The core mode? Query is answered NO.
(430) The stack empty? query is answered NO.
(435) This causes the setting of the current node equal to the top of stack, which is the Pointer to Node 8,
(440) The core mode? Query is answered NO.
(445) Is the top of the stack equal to the noted start of the extension; that is, have we processed the entire extension branch? YES.
(450) Therefore, return core mode status to YES.

Helvetica and Times Roman Processes (B) Enter child processing:
(373) The pointer at the top of the stack is discarded. (stack status: top: Pointer to Node 3; Counter: 2)
(375) The child? query on Node 8 is answered YES,
(380) causing the creation of a new (current) pointer to a child node structure.
(A) Return to the beginning of the process cycle:

The definition and processing of Node 9:

(303) The current pointer is pushed onto the stack.
(305) The core mode? query is answered YES,
(310) causing the population of the current node structure from the CORE data stream. The skeletal node is identified as being Node 9 and having no siblings and no children. Its associated attribute data describes its placement as the lower end of the right side of the stem. (stack status: top: Pointer to Node 9; Counter: 3)

-continued

| Helvetica Process | Times Roman Process |
|---|---|
| | (320) The sibling? query on Node 9 is answered NO, and |
| | (340) The core mode? query is answered YES, setting the stage for a potential extension at this node. |
| (345) The extension? Query analyzes the forth coming data in the EXTENSION stream to determine if there is an extension at this node 9. The query is answered NO meaning there is NO extension at Node 9. | (345) The extension? query analyzes the forth coming data in the EXTENSION stream to determine if there is an extension at this node 9. The query is answered YES meaning there is an extension at Node 9... |
| | (350) causing the Start of the Extension to be noted as the top of the stack, which is the Pointer to Node 9. |
| | (355) The status of core mode is set to NO. |
| | (360) A new (current) pointer to a sibling node structure is created. |
| | (A) Return to the beginning of the process cycle: |

The definition and processing of Node 6:

(303) The current pointer is pushed onto the stack.
(305) The core mode? query is answered NO,
(315) causing the population of the current node structure from EXTENSION data stream. The skeletal node is identified as being Node 6 and having no siblings and at least one child. Its associated attribute data describes its placement as the upper right edge of the top right serif. (stack status: top: Pointer to Node 6; Counter: 4)
(320) The sibling? query on Node 6 is answered NO, and
(340) The core mode? query is answered NO.
(B) Enter child processing:
(373) The pointer at the top of the stack is discarded.
(stack status: top: Pointer to Node 9; Counter: 3)
(375) The child? query on Node 6 is answered YES,
(380) causing the creation of a new (current) pointer to a child node structure.
(A) Return to the beginning of the process cycle:

The definition and processing of Node 7:

(303) The current pointer is pushed onto the stack.
(305) The core mode? query is answered NO,
(315) causing the population of the current node structure from EXTENSION data stream. The skeletal node is identified as being Node 7 and having no siblings and no children. Its associated attribute data describes its placement as the lower right edge of the top right serif.
(stack status: top: Pointer to Node 7; Counter: 4)

-continued (320) The sibling? query on Node 7 is answered NO, and
(340) The core mode? Query is answered NO.
(B) Enter child processing:
(373) The pointer at the top of the stack is discarded.
(stack status: top: Pointer to Node 9; Counter: 3)
(375) The child? query on Node 7 is answered NO.
(395) The core mode? Query is answered NO.
(430) The stack empty? query is answered NO.
(435) This causes the setting of the current node equal to the top of stack, which is the Pointer to Node 9,
(440) The core mode? query is answered NO.
(445) Is the top of the stack equal to the noted start of the extension; that is, have we processed the entire extension branch? YES.
(450) Therefore, return core mode status to YES.

Helvetica and Times Roman Processes (B) Enter child processing:
(373) The pointer at the top of the stack is discarded.
(stack status: top: Pointer to Node 3; Counter: 2)
(375) The child? query on Node 9 is answered NO.
(395) The core mode? query is answered YES, setting the stage for a potential extension at this node.

| Helvetica Process | Times Roman Process |
|---|---|
| (400) The extension? Query analyzes the forth coming data in the EXTENSION stream to determine if there is an extension at this node 9. The query is answered NO meaning there is NO extension at Node 9. | (400) The extension? query analyzes the forth coming data in the EXTENSION stream to determine if there is an extension at this node 9. The query is answered YES meaning there is an extension at Node 9. |
| | (405) The Start of the Extension is noted as the top of the stack, which is the Pointer to Node 3. |
| | (410) The status of core mode is set to NO. |
| | (415) A new pointer to a child node structure is created. |
| | (A) Return to the beginning of the process cycle: |

The definition and processing of Node 10:

(303) The current pointer is pushed onto the stack.
(305) The core mode? query is answered NO,
(315) causing the population of the current node structure from EXTENSION data stream. The skeletal node is identified as being Node 10 and having no siblings and at least one child. Its associated attribute data
describes its placement as the upper right edge of the bottom right serif.
(stack status: top: Pointer to Node 10; Counter: 3)
(320) The sibling? query on Node 10 is answered NO, and

|   |   |
|---|---|
| (340) | The core mode? query is answered NO. |
| (B) | Enter child processing: |
| (373) | The pointer at the top of the stack is discarded.<br>(stack status: top: Pointer to Node 3; Counter: 2) |
| (375) | The child? query on Node 10 is answered YES, |
| (380) | causing the creation of a new (current) pointer to a child node structure. |
| (A) | Return to the beginning of the process cycle: |

The definition and processing of Node 11:

|   |   |
|---|---|
| (303) | The current pointer is pushed onto the stack. |
| (305) | The core mode? query is answered NO, |
| (315) | causing the population of the current node structure from EXTENSION data stream. The skeletal node is identified as being Node 11 and having no siblings and no children. Its associated attribute data describes its placement as the lower right edge of the bottom right serif.<br>(stack status: top: Pointer to Node 11; Counter: 3) |
| (320) | The sibling? query on Node 11 is answered NO, and |
| (340) | The core mode? query is answered NO. |
| (B) | Enter child processing: |
| (373) | The pointer at the top of the stack is discarded.<br>(stack status: top: Pointer to Node 3; Counter: 2) |
| (375) | The child? query on Node 11 is answered NO. |
| (395) | The core mode? query is answered NO. |

Helvetica and Times Roman Processes (430) The stack empty? query is answered NO.
(435) This causes the setting of the current node equal to the top of stack, which is the Pointer to Node 3,

| Helvetica Process | Times Roman Process |
|---|---|
| (440) The core mode? query is answered YES. | (440) The core mode? query is answered NO.<br>(445) Is the top of the stack equal to the noted start of the extension; that is, have we processed the entire extension branch? YES.<br>(450) Therefore, return core mode status to YES. |

Helvetica and Times Roman Processes (B) Enter child processing:
(373) The pointer at the top of the stack is discarded.
(stack status: top: Pointer to Node 13; Counter: 1)
(375) The child? query on Node 3 is answered NO.
(395) The core mode? query is answered YES, setting the stage for a potential extension at this node.

| Helvetica Process | Times Roman Process |
|---|---|
| (400) The extension query analyzes the forth coming data in the EXTENSION stream to determine if there is an extension at this node 3. The query is answered NO meaning there is NO extension at Node 3. | (400) The extension? query analyzes? the forth coming data in the EXTENSION stream to determine if there is an extension at this node 3. The query is answered YES meaning there is an extension at Node 3.<br>(405) The Start of the Extension is noted as the top of the stack, which is the Pointer to Node 13.<br>(410) The status of core mode is set to NO.<br>(415) A new pointer to a child node structure is created. |
| (A) | Return to the beginning of the process cycle: |

The definition and processing of Node 4:

|   |   |
|---|---|
| (303) | The current pointer is pushed onto the stack. |
| (305) | The core mode? query is answered NO, |
| (315) | causing the population of the current node structure from EXTENSION data stream. The skeletal node is identified as being Node 4 and having no siblings and at least one child. Its associated attribute data describes its placement as the lower left edge of the top left serif.<br>(stack status: top: Pointer to Node 4; Counter: 2) |
| (320) | The sibling? query on Node 4 is answered NO, and |
| (340) | The core mode? query is answered NO. |
| (B) | Enter child processing: |
| (373) | The pointer at the top of the stack is discarded.<br>(stack status: top: Pointer to Node 13; Counter: 1) |
| (375) | The child? query on Node 4 is answered YES, |
| (380) | causing the creation of a new (current) pointer to a child node structure. |
| (A) | Return to the beginning of the process cycle: |

The definition and processing of Node 5:

|   |   |
|---|---|
| (303) | The current pointer is pushed onto the stack. |
| (305) | The core mode? query is answered NO, |
| (315) | causing the population of the current node structure from EXTENSION data stream. The skeletal node is identified as being Node 5 and having no siblings and no children. Its associated attribute data describes its placement as the upper left edge of the top left serif.<br>(stack status: top: Pointer to Node 5; Counter: 2) |
| (320) | The sibling? query on Node 5 is answered NO, and |
| (340) | The core mode? query is answered NO. |

-continued

| | | |
|---|---|---|
| | (B) | Enter child processing: |
| | (373) | The pointer at the top of the stack is discarded. (stack status: top: Pointer to Node 13; Counter: 1) |
| | (375) | The child? query on Node 5 is answered NO. |
| | (395) | The core mode? query is answered NO. |

Helvetica and Times Roman Processes (430) The stack empty? query is answered NO.
(435) This causes the setting of the current node equal to the top of stack, which is the Pointer to Node 13,

| Helvetica Process | Times Roman Process | |
|---|---|---|
| (440) The core mode? query is answered YES. | (440) | The core mode? query is answered NO. |
| | (445) | Is the top of the stack equal to the noted start of the extension; that is, have we processed the entire extension branch? YES. |
| | (450) | Therefore, return core mode status to YES. |

Helvetica and Times Roman Processes (B) Enter child processing:
(373) The pointer at the top of the stack is discarded.
(stack status: top: empty! counter: 0)
(375) The child? query on Node 13 is answered NO.
(395) The core mode? query is answered YES, setting the stage for a potential extension at this node.
(400) The extension? query analyzes the forth coming data in the EXTENSION stream to determine if there is an extension at this node 13. The query is answered NO meaning there is NO extension at Node 13.
(430) The stack empty? query is answered YES
(460) Therefore, the process ends !!

2) Character Level Feature Measurement (Local Dimensions) Factoring:

When font data is compressed via the "factoring" or extraction of common data elements, what remains are data which are specific to a given glyph in given typeface. It is the remaining data (i.e., data beyond the common data elements) that are unique. One such piece of information is that which provides fixed distances between unique letterform features that have been linked via skeletal associations. Under the MicroType® font compression technology method, the fixed distance data—among other types of data—is compressed through a normalization process that factors all local dimensions by a typeface level standard scale. The normalization process reduces the range of the values, thereby requiring fewer bits for definition.

Careful evaluation of a resulting distribution of the normalized values shows that when viewed on a skeletal association basis, that is, across all instances of a particular association as applied to all typefaces using the model that comprises that skeletal association, the range of these normalized values applied to that skeletal association is often limited. Generally, the limited range of the normalized values is small because a given association in one letterform in one typeface is nearly equivalent in relative (normalized) terms to that same association found in the same letterform in another typeface.

Where the MicroType® font compression technology method of compression by factoring yields values having a range of one byte each, the character level feature measurement factoring invention achieves an even more efficient compression by additionally extracting a common "base" value that is stored once with the skeletal association at the letterform model level, and the remaining "specific" value needed to render the actual normalized local dimension value is stored at the character or local level. This specific value is a smaller value and requires still fewer bits for definition.

Therefore, an encoding scheme that allows for the specification of a basis for a given association in the model enables a further compression of the data. The actual local dimension used to define the measure of an association is thereby rendered mathematically by using input from the model, the character, and the typeface.

Referring again to FIGS. 8A and 8B, the schematic diagram includes character level feature measurement (local dimensions) factoring. In the MicroType® prior art technology, letterform hints 25a, 25c and 25e were factored to reduce the font collection storage space. The prior art local dimensions factoring is represented by a set of dashed lines 21a, 21b, 21c, corresponding to storing a standard scale, which is stored at the typeface (font) level in blocks 28a, 28b, and 28c.

The present invention local dimensions factoring further factors the skeletal association information stored in the blocks 22b, 24b, 26b at the character level by extracting a common base value from hints 25a, 25c, 25e, respectively, and storing it at the letterform model level MI 30a in the model letterform MIB 32b. The factoring is represented as factoring links 15a, 15b, 15c. Note that the factoring represented is for the letterform "B", and that other letterforms, such as letterforms "A" and "§", are factored independently and stored to the letterform model 30a level, into MIA 32a and MI§ 32c, respectively. The font collection 10 is data compressed through this broad approach to the local dimensions factoring process.

Figure 11:
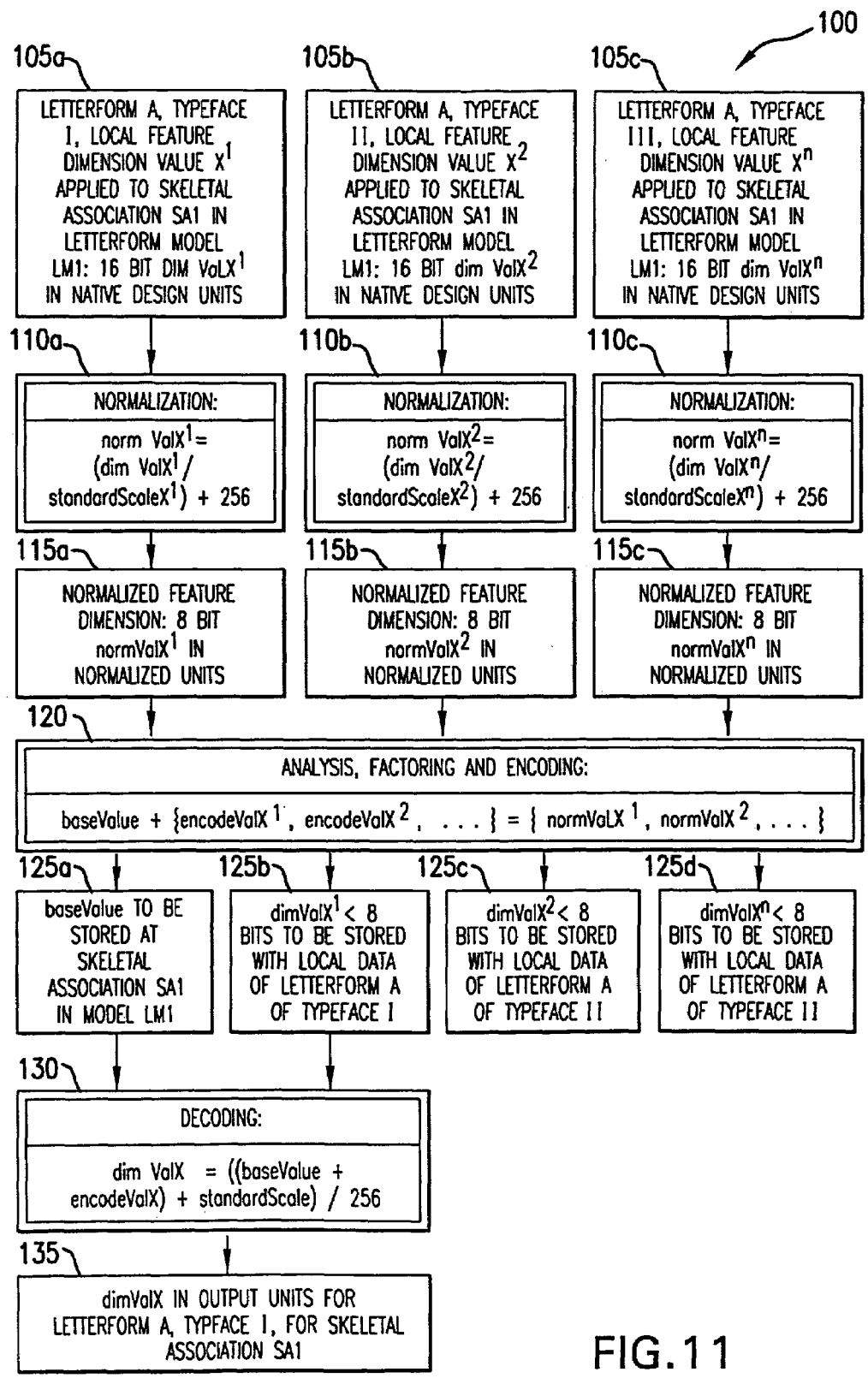
FIG. 11 is a process diagram of a character level feature measurement (local dimensions) process, as shown in the schematic diagram of FIGS. 8A and 8B.

FIG. 11 outlines one potential encoding scheme for local feature dimension values applied to a single skeletal association (SA1) 23a in a single letterform model (LM1) as applied to Letterform A 22a of Typeface I 20a, Letterform A 24a of Typeface II 20b and Letterform A 26a of Typeface III 20c (FIGS. 8A and 8B). A flow diagram 100 representing a character level feature measurement (local dimensions) factoring, as schematically shown in FIG. 8. The process 100 assumes three typefaces 20a, 20b, 20c (FIG. 8) having a letterform "A" 22a, 24a, 26a (FIGS. 8A and 8B) with local feature dimensions 23a, 23c, 23e (FIGS. 8A and 8B). Each typeface letterform dimension value 105a, 105b, 105c (FIG. 11), collectively input 105, has corresponding dimension value variables $dimValX^1$, $dimValX^2$, $dimValX^n$, respectively.

The dimension values are passed to a respective normalization routine 110a, 110b, 110c, corresponding to each typeface 105a, 105b, 105c. A $standardScaleX^1$, $standardScaleX^2$, and $standardScaleX^n$ is predetermined and used in each respective normalization routine 110a, 110b, 110c.

A result of the normalization process is a normalization value 115a, 115b, 115c (referred to as $normValX^1$, $normValX^2$, and $normValX^n$, respectively) for each normalization processor 110a, 110b, 110c, respectively. The resulting normalized feature dimensions in 115 is an 8-bit value, compared to the letterform dimension values 105a, 105b, 105c input 16-bit in native design units. These resulting values 115a, 115b, 115c are passed to an analysis factoring and encoding routine 120. The analysis factoring and encoding routine 120 receives the resulting values 115a, 115b, 115c, also referred to as normalized values 115, and returns a base value plus an encoded set of values corresponding to the normalized values 115. The process used to perform the separation into base values and encoded values could be any number of standard mathematical techniques. One such technique consists of two steps: (1) the evaluation of the entire set of normalized values to determine the minimum value; and (2) the subtraction of that minimum or base value from all members of the set, thereby creating a data set consisting of two parts: the base value and encoded value, which when added to the base value, results in the normalized value.

The base value is stored at the skeletal association SA1 23*a* level in model MIA 32*a* LM1 30*a* (FIGS. 8A and 8B) in step 125*a*. A first encoded value is stored with local data of letterform "A" 22*a* of TFI 20*a* (FIGS. 8A and 8B) in step 125*b*. A second encoded value is stored with local data of letterform "A" 24*a* of TFII 20*b* (FIG. 8) in step 125*c*. An "nth" encoded value is stored with local data of letterform "A" 26*a* of TFIII 20*c* (FIGS. 8A and 8B) in step 125*d*. Each of the stored encoded dimension values are fewer than 8-bits, as compared to the original 16-bits in the native design units in each typeface 20 (FIGS. 8A and 8B), and found in the input 105 to the process of FIG. 11.

To restore the unencoded, unfactored values as originally represented in input 105, a decoding routine 130 is used. The inputs to the decoding routine 130 are the base value, which was stored in step 125*a*, and one of the encoded values stored in step 125*b*, 125*c*, or 125*d*. Practically speaking, the decoding routine 130 simply performs the reverse of the encoding process of steps, for example, 105*a*, 110*a*, 115*a*, 120, 125*a*, and 125*b*. A resulting dimension value, dimValX$^1$ in output units for letterform "A" 22*a*, TFI 20*a* (FIGS. 8A and 8B), skeletal association SA1, depicted as MIA (FIGS. 8A and 8B), 32*a* is returned in step 135. A dimValX$^2$ and dimValX$^n$ in output units result from decoding the base value 125*a* with the encoded dimension values of 125*c*, 125*d*, respectively.

3) Typeface Level Feature Measurement (Global Dimensions) Factoring:

There are many feature measurements within a given typeface that are used consistently throughout many characters in that typeface. For instance, the height of the serif is most often the same for all lowercase characters that have serifs.

In the prior art, this notion of consistency has been used to promote some level of data compactness by placing all such typeface global measurements in a single table at the typeface level, and then referencing these values by index at the character level. The Intellifont® font scaling technology employs this technique and used 8-bit quantities as indices to reference 16-bit quantities that are the global measurements.

The MicroType® font compression technology uses the same technique, but achieves greater compactness by storing the 8-bit indices with the model, from which the indices are shared across many typefaces, and by normalizing the 16-bit values to render them 8-bit quantities.

Once again, careful analysis of the resulting data for a given collection of fonts reveals that if the dimension table is ordered consistently for all typefaces in the collection, such that index 0 is always the lowercase straight stem, index 1 is always the round stem, etc., the normalized values at a given table index for all typefaces tend to be close in most cases and even equivalent in other cases. This limited range of normalized values presents an opportunity to seek some level of compression within a single indexed global dimension across all its occurrences within a font collection.

In FIG. 12, note global dimension index 0 for typefaces 0 through 8. The normalized dimension values are 148, 135, 154, 161, 151, 138, 141, 147 and 142, respectively; spanning 135 to 161, a range of only 26 normalized units. This limited range is due to the normalization of global dimensions, each normalized at its respective Typeface Level. Using the global dimension factoring aspect of the present invention, when each value is expressed as a deviation from the standard value of 135 for that indexed dimension (135+13, 135+0, 135+19, 135+26, 135+16, 135+5, 135+6, 135+12, 135+7, respectively), data storage for each normalized value requires only 5 bits per value, rather than 8 bits per value.

Additionally, analysis reveals that, in a set of ordered lists of dimensions, the variation from typeface to typeface of normalized global dimension values at a specific index often times runs nearly "parallel" to the variation from typeface to typeface of values at other indices. This presents an opportunity to seek some level of compression within a single indexed global dimension based on its relationship to other indexed dimensions.

Again, in FIG. 12, note global dimension index 1 for typefaces 0 through 8. The normalized dimension values range from 135 to 159—a range of only 24 scaled units, requiring only five bits. However, using an extension of the global dimension factoring of the present invention, each value is optionally captured as its deviation from the normalized value for the same typeface at a font collection-wide specified indexed dimension—in this case, its deviation from dimension index 0. Note, that by capturing the normalized values in this way, their values now range from −2 to 4—a range requiring only four bits.

In accordance with the teachings of typeface level feature measurement (global dimension) factoring invention, any global dimension value can be captured, encoded, and then decoded mathematically by one of the two methods described above, depending on which is more efficient. The two techniques are summarized as follows:

1) Base/Range Method: Because all normalized dimension values for a given indexed dimension, as applied to all typefaces in a collection, tend to cluster about the same normalized value, the range of deviation tends to be substantially less than the total potential range of actual normalized values. By establishing an encoding scheme that allows for the specification of a basis and a range of deviation, the data is further compressed by storing a base value and range of deviation at the font collection level and by storing only the deviation at the typeface level.

2) Parent Base/Range Method: Because the variation in all normalized dimension values for a given indexed dimension, as applied to all typefaces in a collection, tend to "run parallel" to the variations of normalized dimension values of certain other indexed dimensions, the range of differences between each value of a given indexed dimension, and the corresponding value of that certain other indexed dimension, tend to be small. By establishing an encoding scheme allowing for the specification of a "parent" or "parallel" indexed dimension and a range of differences, it is possible to further compress the data by storing an index and range of differences at the font collection level and by storing only the differences at the typeface level.

Referring again to FIGS. 8A and 8B, the schematic diagram includes a typeface level feature measurement (global dimension) factoring process. Each typeface 20*a*, 20b, and 20c (collectively 20) includes a plurality of dashed arrows. TFI 20a has dashed arrows 52a, 52b, 52c. TFII 20b has dashed arrows 54a, 54b, 54c. TFIII 20c has dashed arrows 56a, 56b, 56c. Each of the dashed arrows, 52, 54, 56 represents the Intellifont® font compression technology, factoring typeface global measurements into a single table at the typeface level, where the tables are represented as tables 53, 55, 57, respectively.

Extending from TFI 20a is a dashed arrow 52d. Extending from TFII 20b is a dashed arrow 54d. And, extending from TFIII 20c is a dashed arrow 56d. Each dashed arrow 52d, 54d, 56d represents the MicroType® font compression technology, which achieves greater compactness by storing 8-bit indices with the models 30, where the indices are shared across many typefaces, as discussed above. The indices in the MicroType® font compression technology prior art are stored in MI 30, for instance, in an index table 58.

Further shown in the schematic diagram of FIGS. 8A and 8B are pairs of solid line arrows 62, 64, 66 starting at each of the typeface 20 tables 53, 55, 57. TFI 20a has solid line arrows 62a, 62b starting at table 53. TFII 20b has solid line arrows 64a, 64b starting at table 55. TFIII 20c has solid line arrows 66a, 66b starting at table 57. Each of the solid line arrows 62, 64, 66, represents a factoring process being applied to each of their respective tables 53, 55, and 57, as part of the global dimension factoring aspect of the present invention.

Each solid line arrow 62, 64, 66 terminates at a table 50a or 50b shown at the font collection 10 level. Table 50a represents data stored as a base value and a range of deviation values according to the base/range method discussed above. Table 50b includes an index and range of differences values according to the parent base/range method discussed above. In the case of table 50a, each corresponding typeface table 53, 55, 57 includes only the deviation stored at the typeface level. In the case of table 50b, each corresponding table 53, 55, 57 includes only differences stored at the typeface level.

While this invention has been particularly shown and described with references to preferred embodiments thereof, it will be understood by those skilled in the art that various form changes in and details may be made therein without departing from the spirit and scope of the invention as defined by the appended claims.

What is claimed is:

1. A method in a system that uses font information, comprising:

for a collection of fonts, each font having a set of characters with unique letterform features linked via skeletal associations, storing a respective factored collection-wide subset of skeletal associations, wherein the collection-wide subset of associations are stored in a generic font core data store;

for a subset of the characters in a subset of the fonts, storing respective factored character-wide data for each skeletal association in a subset of skeletal associations, wherein the factored character-wide data are stored in a generic character association database; and for a subset of the characters for a subset of the typefaces, storing typeface-specific skeletal association data.

2. A method for generating a collection of fonts from font information, the method comprising:

providing a plurality of font information for a collection of fonts, each font comprising a plurality of characters;

loading:

a first set of character information including character information for a subset of fonts in a collection of fonts; and a second set of character information including a core set of associations representing character information that is generic to said first set of character information; and combining said first and second sets of character information, thereby building a collection of character models generic to said subset of fonts.

3. The method of claim 2 further including:

loading font-specific character-specific information; and combining said font-specific character-specific information with said collection of character models, thereby generating the collection of fonts.

4. An apparatus for generating a collection of fonts from font information, the apparatus comprising:

a storage area storing a plurality of font information for a collection of fonts, each font including a plurality of characters, wherein the font information includes:

a first set of character information including character information for a subset of fonts; and a second set of character information including a core set of associations representing character information that is a subset of said first set of character information; and a processor routine operating on the data storage and retrieval system and coupled to the storage area, wherein the processor routine retrieves said first and second sets of character information and combines the information to thereby generate a collection of character models generic to said subset of fonts.

5. The apparatus according to claim 4 further including a third set of character information including font-specific character-specific information, said processor routine (i) retrieving said third set of character information, and (ii) combining the third set of character information with the generated collection of character models to thereby generate the collection of fonts.

6. An apparatus that uses font information, comprising:

a data storage medium, comprising:

a collection of fonts, each font comprising a plurality of characters for each of the fonts;

a collection-wide model having factored collection-wide character information;

a font-specific model having character-wide character information; and a character-specific model having character-specific character information.

7. The apparatus according to claim 6, wherein the collection-wide character information includes a base value, and character-wide and character-specific character information includes specific values.

8. An apparatus that uses font information, comprising:

a data storage medium, comprising:

a collection of fonts, each font comprising a plurality of characters for each of the fonts;

a collection-wide model having factored collection-wide character information;

a font-specific model having character-wide character information; and a character-specific model having character-specific character information, wherein the collection-wide character information includes a base value, and character-wide and character-specific character information includes specific values, and wherein the character information is normalized.

9. A method in a system that uses font information, comprising:
for a collection of fonts including a set of characters for each of the multiple fonts, each character comprising a plurality of skeletal associations, storing collection-wide character-specific association information;
for each font, storing font-specific character-wide character-specific association information; and
wherein reducing an amount of font-specific character information results in a storage size reduction for the collection of fonts.

10. The method according to claim 9, wherein the collection-wide character information includes a base value, and character-wide and character-specific character information includes specific values.

11. A method in a system that uses font information, comprising:
for a collection of fonts including a set of characters for each of the multiple fonts, each character comprising a plurality of skeletal associations, storing collection-wide character-specific association information;
for each font, storing font-specific character-wide character-specific association information; and
wherein reducing an amount of font-specific character information results in a storage size reduction for the collection of fonts, and wherein the character information is normalized.

12. The method according to claim 9 further including, for each character in each font in the font collection, storing font-specific character-specific skeletal association information corresponding to the font-wide character-specific association information.

13. A system that uses font information, comprising:
a data storage medium, comprising:
a collection of fonts including a set of characters for each of the multiple fonts, each character comprising a plurality of skeletal associations;
a first set of character information having font-wide information for the collection of fonts; and
a second set of character information having font-specific skeletal association information for each of the multiple fonts; and
a processor coupled to said first and second sets of information and the data storage medium, said processor storing to the data storage medium (i) a subset of font-wide character-specific skeletal association information in said first set of character information, and (ii) a subset of font-specific character skeletal association information in said second set of character information.

14. The apparatus according to claim 13 further including a third set of character information having font-specific character-specific information, wherein the processor is coupled to said third set of information and stores a subset of said third set of information to said data storage medium.

15. A method for generating a collection of fonts from font information, the method comprising:
providing a plurality of font information for a collection of fonts, each font comprising a plurality of characters, each character comprising a plurality of skeletal associations;
loading:
a first set of skeletal association information generic to a subset of fonts; and
a second set of skeletal association information having character-specific information for at least one font; and
combining said first and second sets of skeletal association information, thereby generating a plurality of font-specific character-specific skeletal associations for generating the collection of fonts.

16. The method according to claim 15, wherein (i) said first set includes a base value for corresponding skeletal associations, and (ii) said second set includes an encoded value for each corresponding skeletal association.

17. A method for generating a collection of fonts from font information, the method comprising:
providing a plurality of font information for a collection of fonts, each font comprising a plurality of characters, each character comprising a plurality of skeletal associations;
loading:
a first set of skeletal association information generic to a subset of fonts; and
a second set of skeletal association information having character-specific information for at least one font; and
combining said first and second sets of skeletal association information, thereby generating a plurality of font-specific character-specific skeletal associations for generating the collection of fonts;
wherein (i) said first set includes a base value for corresponding skeletal associations, and (ii) said second set includes an encoded value for each corresponding skeletal association, and wherein combining said first and second sets is performed according to the formula: $dimValX^y = ((baseValue + encodeValX^y) * standardScale^y)/256$, $y=1, 2, \ldots n$; where baseValue is a factored skeletal association value in said first set corresponding to the dimension being calculated; $encodeValX^y$ is a remaining specific skeletal association value in said second set corresponding to an actual normalized local value corresponding to the dimension being calculated; and $standardScale^y$ is a predetermined normalizing value.

18. An apparatus for generating a collection of fonts, the apparatus comprising:
a storage area storing:
a plurality of font information for a collection of fonts, each font comprising a plurality of characters, each character comprising a plurality of skeletal associations;
a first set including skeletal association information generic to a subset of the fonts; and
a second set including skeletal association information having character-specific information for at least one font; and
a processor routine operating on the data storage and retrieval system and coupled to the storage area, said processor routine retrieving said first and second sets of skeletal association information and combines said first and second sets into a single resulting set, thereby generating a plurality of font-specific character-specific skeletal associations for generating the collection of fonts.

19. The apparatus according to claim 18, wherein (i) first set includes a base value for corresponding skeletal associations, and (ii) said second set includes an encoded values for each corresponding skeletal association.

20. An apparatus for generating a collection of fonts, the apparatus comprising:
a storage area storing:
a plurality of font information for a collection of fonts, each font comprising a plurality of characters, each character comprising a plurality of skeletal associations;
a first set including skeletal association information generic to a subset of the fonts; and
a second set including skeletal association information having character-specific information for at least one font; and
a processor routine operating on the data storage and retrieval system and coupled to the storage area, said processor routine retrieving said first and second sets of skeletal association information and combines said first and second sets into a single resulting set, thereby generating a plurality of font-specific character-specific skeletal associations for generating the collection of fonts;
wherein (i) first set includes a base value for corresponding skeletal associations, and (ii) said second set includes an encoded values for each corresponding skeletal association, and wherein combining said first and second sets is performed according to the formula: $dimValX^y = ((baseValue + encodeValX^y) * standardScale^y)/256$, $y = 1, 2, \ldots n$; where baseValue is a factored skeletal association value in said first set corresponding to the dimension being calculated; $encodeValX^y$ is a remaining specific skeletal association value in said second set corresponding to an actual normalized local value corresponding to the dimension being calculated; and $standardScale^y$ is a predetermined normalizing value.

21. A method in a system that uses font information, comprising:
for a collection of fonts including a set of characters for each of the multiple fonts, each character comprising a plurality of character dimensions, storing font-wide character dimension information, thereby reducing an amount of font-specific character information;
for each font, storing font-specific character dimension information;
wherein for the plurality of character dimensions, font-wide character dimension information includes a base value and a range of deviation values; and
wherein storing font-wide character dimension information separate from font-specific character information results in a storage size reduction for the collection of fonts.

22. The method according to claim 21, wherein for the plurality of character dimensions, font-specific character dimension information includes a deviation value.

23. The method according to claim 22, wherein for a single character dimension, (i) font-wide character dimension information includes an index and a range of differences; and (ii) font-specific character dimension information includes only differences.

24. An apparatus that uses font information, comprising:
a data storage medium, comprising:
a collection of fonts including a set of characters for each of the multiple fonts, each character comprising a plurality of character dimensions;
a first set of character information having font-wide character dimension information for the collection of fonts; and
a second set of character information having font-specific character dimension information for each of the multiple fonts; and
a processor coupled to said first and second sets of character information and the data storage medium, said processor storing to the data storage medium (i) a subset of font-wide character dimension information in said first set of character information, and (ii) a subset of font-specific character dimension information in said second set of character information;
wherein for the plurality of character dimensions, (i) font-wide character dimension information includes a base value and a range of deviation values.

25. The apparatus according to claim 24, wherein for the plurality of character dimensions, font-specific character dimension information includes a deviation value.

26. The apparatus according to claim 24, wherein for a single character dimension, (i) font-wide character dimension information includes an index and a range of differences; and (ii) font-specific character dimension information includes a only differences.

27. A method for generating a collection of fonts from font information, comprising:
providing a plurality of font information for a collection of fonts, each font comprising a plurality of characteristics and a plurality of dimensions common to a subset of characters in the respective font;
loading:
a first set of dimension information common to a subset of the multiple fonts; and
a second set of dimension information including font-specific dimension information; and
combining said first and second sets, thereby forming character dimension information for the collection of fonts.

28. The method according to claim 27, wherein the dimensions are arranged in a consistent order for each font in the collection of fonts.

29. The method according to claim 28, wherein for each dimension across the plurality of fonts in the font collection, the first set includes a base value and a range of deviations and the second set includes a deviation.

30. The method according to claim 28, wherein for each font in the font collection across the plurality of dimensions, the first set includes an index and a range of differences and the second set includes only differences.

31. An apparatus for generating a collection of fonts from font information, comprising:
a data storage area storing a plurality of font information for a collection of fonts, each font comprising a plurality of characteristics and a plurality of dimensions common to at least one subset of characters in the respective font, wherein the dimensions comprise:
a first set of dimension information common to a subset of the multiple fonts; and
a second set of dimension information including font-specific dimension information; and
a processor routine coupled to the data storage area and operating on the data storage and retrieval system, said processor routine combining said first and second sets, thereby generating character dimension information for the collection of fonts.

32. The apparatus according to claim 31, wherein the dimensions are arranged in a consistent order for each font in the collection of fonts.

33. The apparatus according to claim 32, wherein for each dimension across the plurality of fonts in the font collection, the first set includes a base value and a range of deviations and the second set includes a deviation.

34. The apparatus according to claim 32, wherein for each font in the font collection across the plurality of dimensions, the first set includes an index and a range of differences and the second set includes only differences.

35. An apparatus for generating a collection of fonts from font information, comprising:
- a data storage area storing a plurality of font information for a collection of fonts, each font comprising a plurality of characters and a plurality of dimensions common to at least one subset of characters in the respective font, wherein the dimensions comprise:
  - a first set of dimension information common to a subset of the multiple fonts; and
  - a second set of dimension information including font-specific dimension information for at least one font; and
- a processor routine coupled to the data storage area and operating on the data storage and retrieval system, said processor routine combining said first and said second sets of dimension information, thereby generating character dimension information for the collection of fonts.

36. The apparatus according to claim 35, wherein the dimensions are arranged in a consistent order for each font in the collection of fonts.

37. The apparatus according to claim 36, wherein for each dimension across the plurality of fonts in the font collection, the first set includes a base value and a range of deviations and the second set includes a deviation.

38. The apparatus according to claim 36, wherein for each font in the font collection across the plurality of dimensions, the first set includes an index and a range of differences and the second set includes only differences.

39. A method for compressing font information in a collection of fonts, comprising:
- creating a library of models for letterforms for multiple typefaces in which multiple models are used for the same letterform of different typefaces in the collection of fonts; and
- creating core models comprising a subset of skeletal nodes that are common to the multiple models of the same letterform for different typefaces.

40. A method for compressing font information, comprising:
- factoring skeletal association information by extracting a common base value from hints for each letterform in each typeface; and
- storing the common base value in a model letterform for multiple typefaces.

* * * * *

UNITED STATES PATENT AND TRADEMARK OFFICE
CERTIFICATE OF CORRECTION

PATENT NO. : 7,184,046 B1 Page 1 of 1
APPLICATION NO. : 09/407381
DATED : February 27, 2007
INVENTOR(S) : Thomas B. Hawkins It is certified that error appears in the above-identified patent and that said Letters Patent is hereby corrected as shown below:

<u>Column 29</u>,
Line 27, "encodeVaLX$^y$" should read -- encodeValX$^y$ --.

Signed and Sealed this

Twenty-third Day of September, 2008

JON W. DUDAS
*Director of the United States Patent and Trademark Office*